United States Patent
Hong

(10) Patent No.: US 11,365,893 B2
(45) Date of Patent: *Jun. 21, 2022

(54) AIR CONDITIONER

(71) Applicant: LG ELECTRONICS INC., Seoul (KR)

(72) Inventor: Seokpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

This patent is subject to a terminal disclaimer.

(21) Appl. No.: 16/493,696

(22) PCT Filed: Jan. 11, 2018

(86) PCT No.: PCT/KR2018/000563
§ 371 (c)(1),
(2) Date: Sep. 12, 2019

(87) PCT Pub. No.: WO2018/169184
PCT Pub. Date: Sep. 20, 2018

(65) Prior Publication Data
US 2020/0132317 A1    Apr. 30, 2020

(30) Foreign Application Priority Data

Mar. 13, 2017  (KR) .................. 10-2017-0031383

(51) Int. Cl.
*F24F 1/32*    (2011.01)
*C22C 9/00*    (2006.01)
(Continued)

(52) U.S. Cl.
CPC .................. *F24F 1/32* (2013.01); *C22C 9/00* (2013.01); *C22C 38/02* (2013.01); *C22C 38/40* (2013.01);
(Continued)

(58) Field of Classification Search
CPC ..................................................... C22C 38/42
See application file for complete search history.

(56) References Cited

U.S. PATENT DOCUMENTS 5,598,717 A * 2/1997 Sakamoto ................ F24F 11/30
62/211
6,477,848 B1 * 11/2002 Domyo ................... F25B 41/40
62/114
(Continued)

FOREIGN PATENT DOCUMENTS

JP   10-1995-0007792 A   7/1995
JP   H10-115296 A         5/1998
(Continued)

OTHER PUBLICATIONS

"Facility/Technical/Inspection Code for Manufacture of Storage Tanks and Pressure Vessels for High-pressure Gases", KGS AC111 2013.

*Primary Examiner* — Christopher R Zerphey
(74) *Attorney, Agent, or Firm* — Dentons US LLP

(57) ABSTRACT

The present invention relates to an air conditioner. A first invention according to the present embodiment is an air conditioner which has a refrigeration capacity of 16 kW to 28 kW, inclusive, and uses a mixed refrigerant R134a as a refrigerant, and in which a refrigerant pipe includes a ductile stainless steel pipe having 1% or less of a delta-ferrite matrix structure with respect to the grain size area thereof.

21 Claims, 28 Drawing Sheets

(51) Int. Cl.
  *C22C 38/02* (2006.01)
  *C22C 38/40* (2006.01)
  *C22C 38/42* (2006.01)
  *C22C 38/44* (2006.01)
  *C22C 38/58* (2006.01)
  *F25B 41/40* (2021.01)

(52) U.S. Cl.
  CPC .............. *C22C 38/42* (2013.01); *C22C 38/44* (2013.01); *C22C 38/58* (2013.01); *F25B 41/40* (2021.01); *C21D 2211/001* (2013.01); *F25B 2400/12* (2013.01); *F25B 2500/05* (2013.01); *F25B 2500/06* (2013.01)

(56) References Cited

U.S. PATENT DOCUMENTS

| | | | | |
|---|---|---|---|---|
| 9,175,361 | B2* | 11/2015 | Hatano | C22C 38/001 |
| 10,648,716 | B2* | 5/2020 | Hong | F25B 1/00 |
| 10,830,379 | B2* | 11/2020 | Hong | C22C 38/04 |
| 10,830,498 | B2* | 11/2020 | Hong | F25B 13/00 |
| 2015/0167134 | A1* | 6/2015 | Leistner | C22C 38/34 |
| | | | | 420/57 |
| 2018/0313550 | A1* | 11/2018 | Baetens | F25B 41/40 |
| 2020/0009693 | A1* | 1/2020 | Hong | F25B 9/00 |
| 2020/0011547 | A1* | 1/2020 | Hong | F25B 41/20 |
| 2020/0011574 | A1* | 1/2020 | Hong | B23K 31/027 |
| 2020/0072479 | A1* | 3/2020 | Hong | F25B 41/00 |
| 2020/0103150 | A1* | 4/2020 | Hong | C22C 38/34 |
| 2020/0116366 | A1* | 4/2020 | Hong | F25B 1/04 |
| 2020/0116402 | A1* | 4/2020 | Hong | F25B 41/20 |
| 2020/0132315 | A1* | 4/2020 | Hong | C22C 38/40 |
| 2020/0132316 | A1* | 4/2020 | Hong | F16L 9/02 |
| 2020/0132349 | A1* | 4/2020 | Hong | C21D 9/08 |
| 2020/0232659 | A1* | 7/2020 | Hong | C21D 9/50 |
| 2021/0140726 | A1* | 5/2021 | Hong | C22C 38/44 |

FOREIGN PATENT DOCUMENTS

| | | |
|---|---|---|
| JP | 2006-3079 A | 1/2006 |
| JP | 2010-121190 A | 6/2010 |
| JP | 2010-151327 A | 7/2010 |
| JP | 2012-251767 A | 12/2012 |
| JP | 2013-137152 A | 7/2013 |
| JP | 6012189 B2 | 10/2016 |
| KR | 10-2003-0082387 A | 10/2003 |
| KR | 10-2004-0100668 A | 12/2004 |
| KR | 10-2013-0045931 A | 5/2013 |
| KR | 10-2016-0028400 A | 3/2016 |
| WO | 00-52396 A1 | 9/2000 |
| WO | 2013/146103 A1 | 10/2013 |
| WO | 2013/151043 A1 | 10/2013 |
| WO | 2016/051606 A1 | 4/2016 |
| WO | 2016-104974 A1 | 6/2016 |
| WO | 2016-051606 A1 | 7/2016 |

* cited by examiner

[FIG. 1]
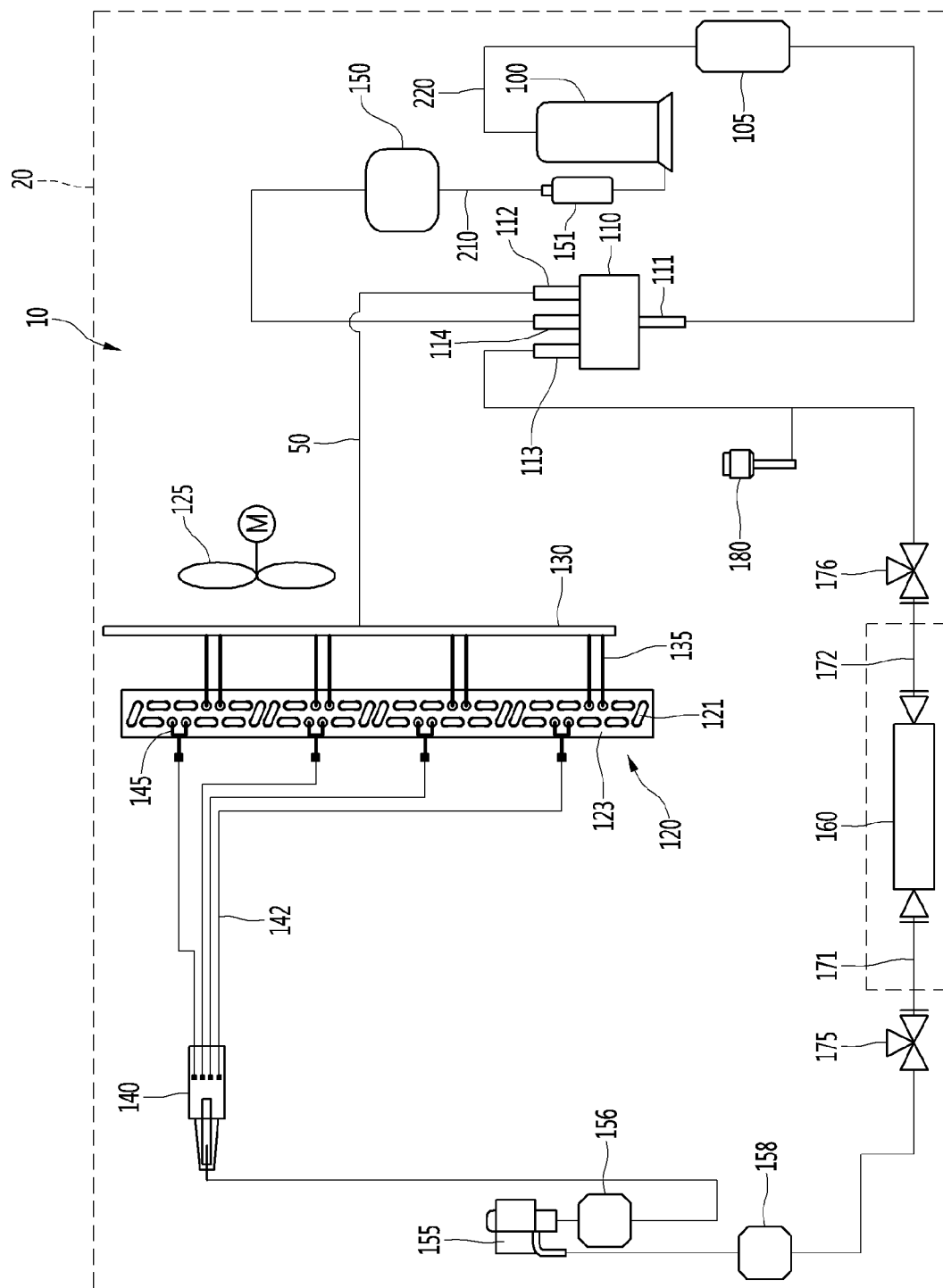

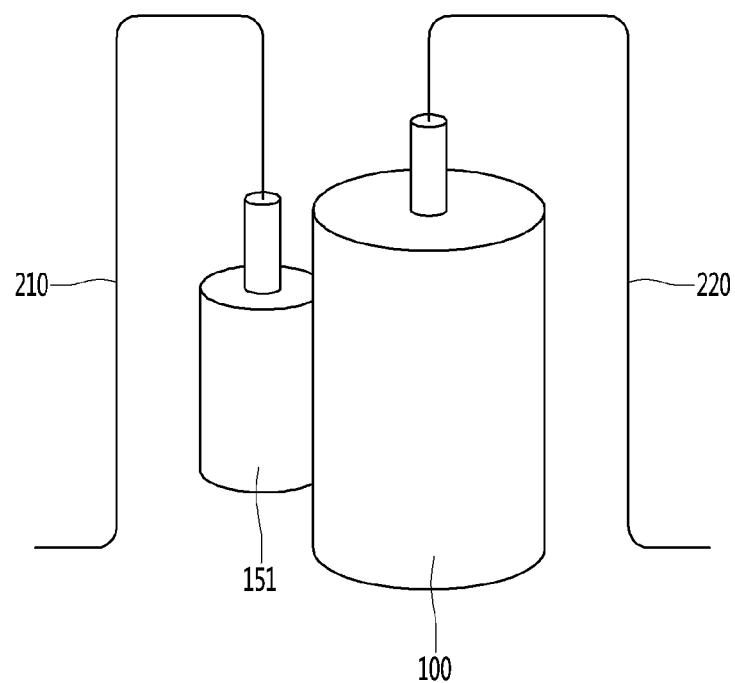
[FIG. 2]

[FIG. 3]
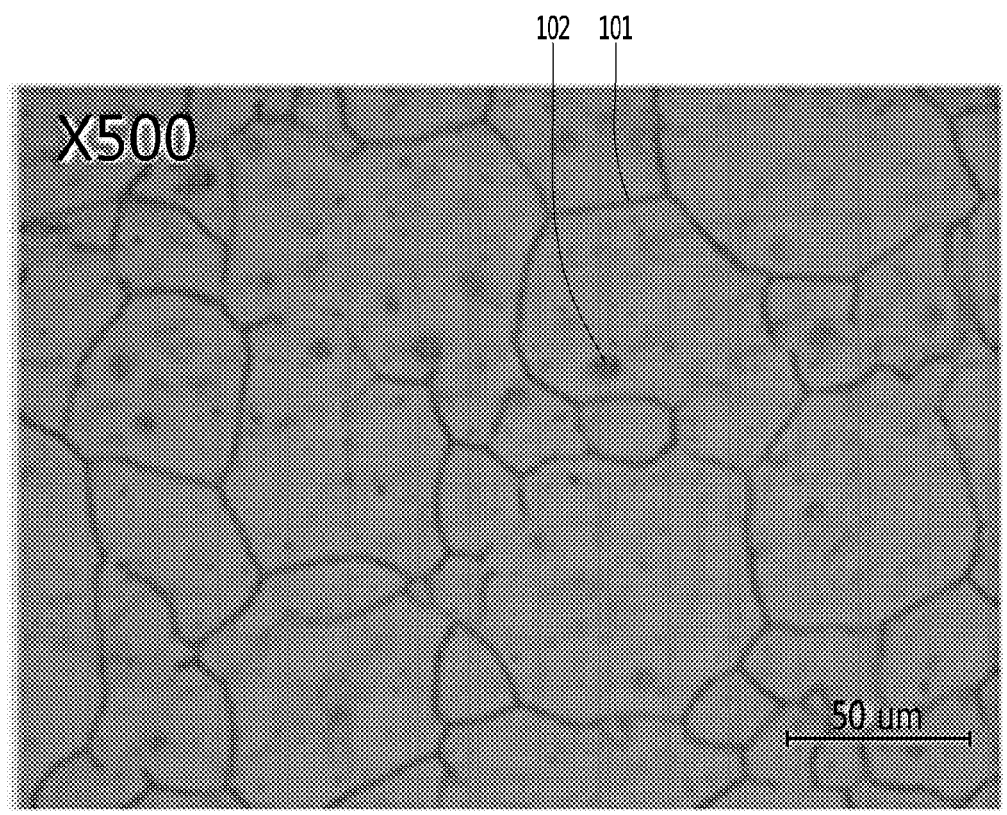

[FIG. 4]
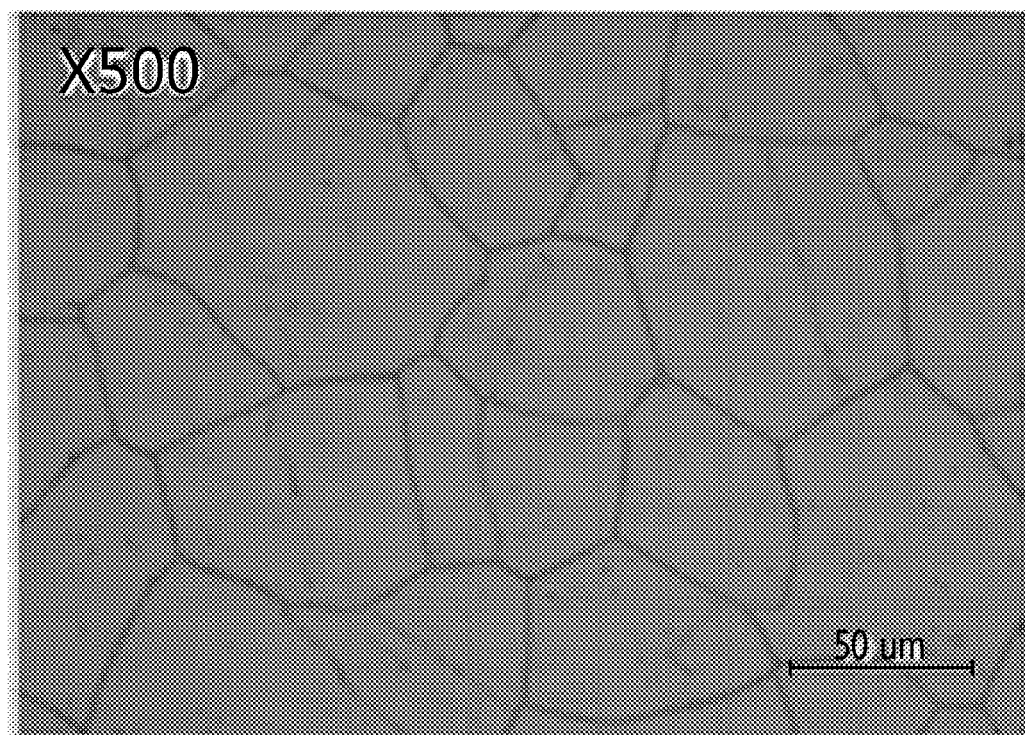

[FIG. 5]
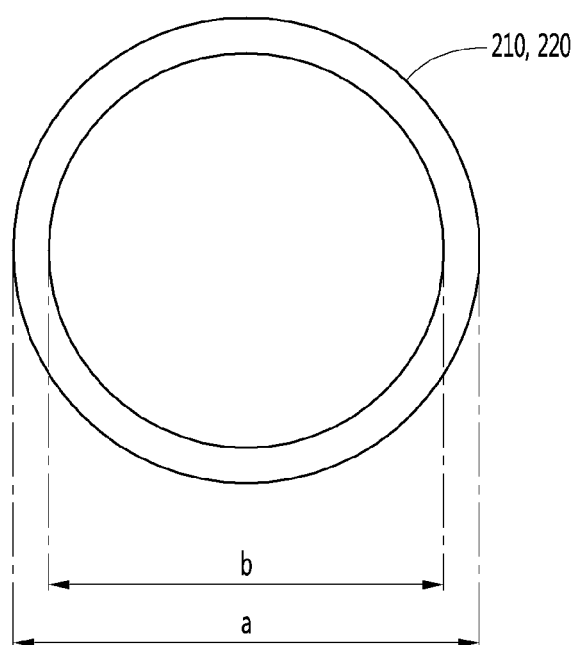

[FIG. 6]
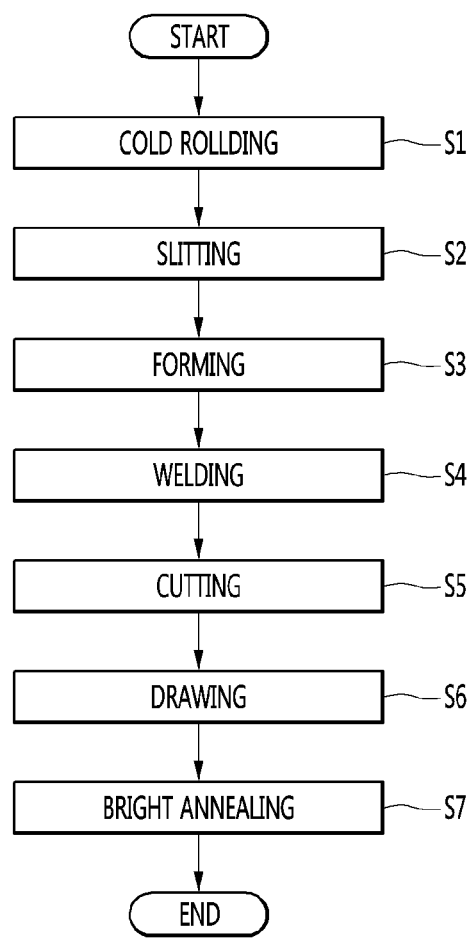

[FIG. 7]
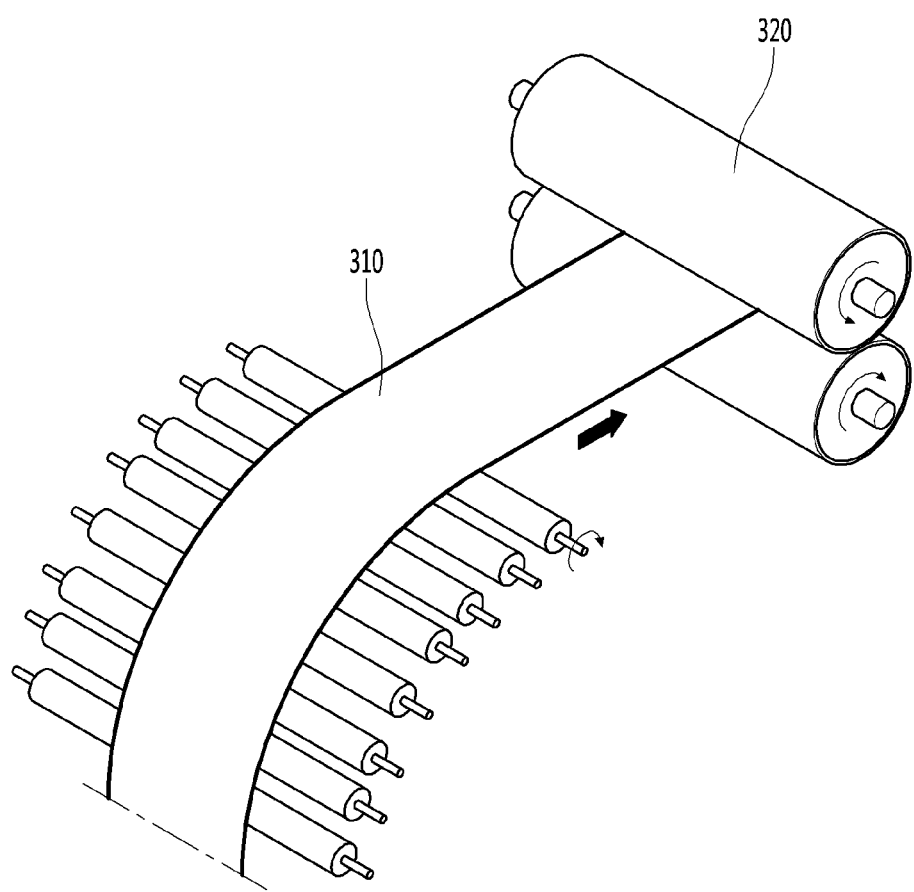

[FIG. 8]
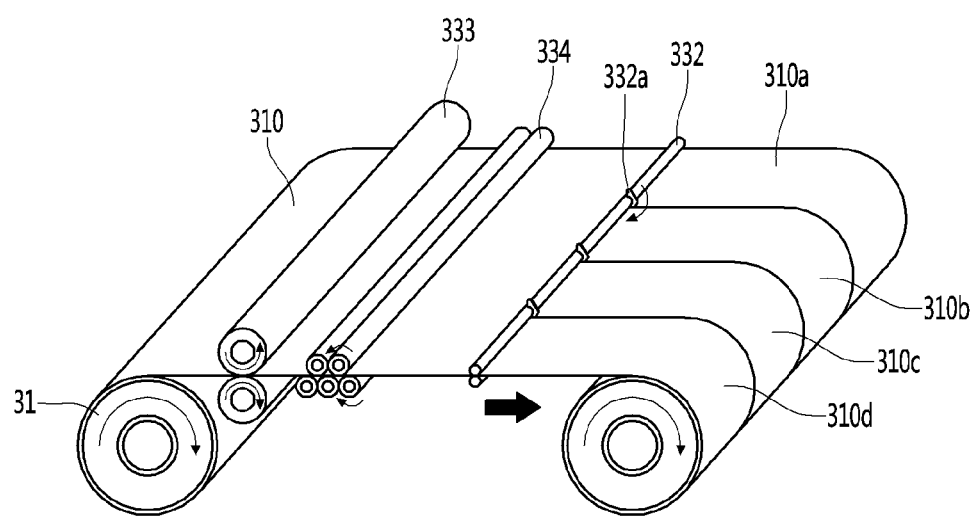

[FIG. 9]
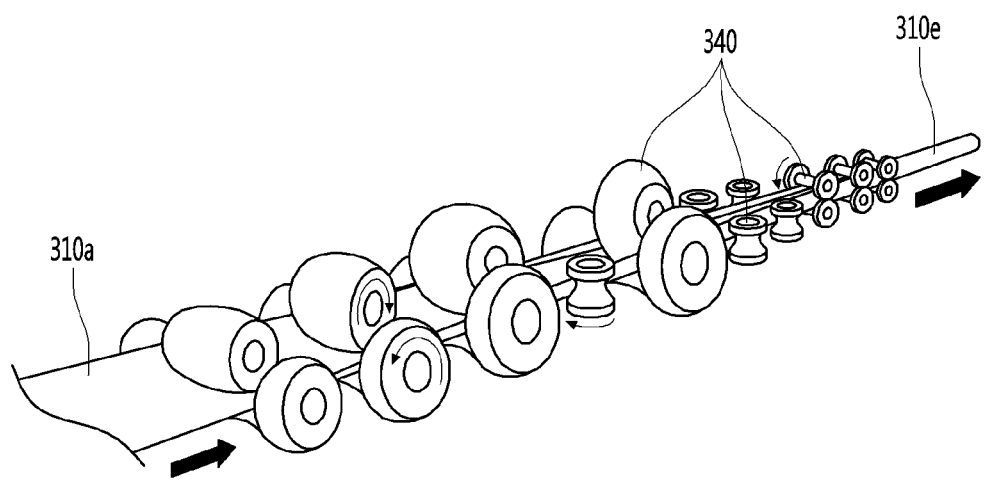

[FIG. 10]
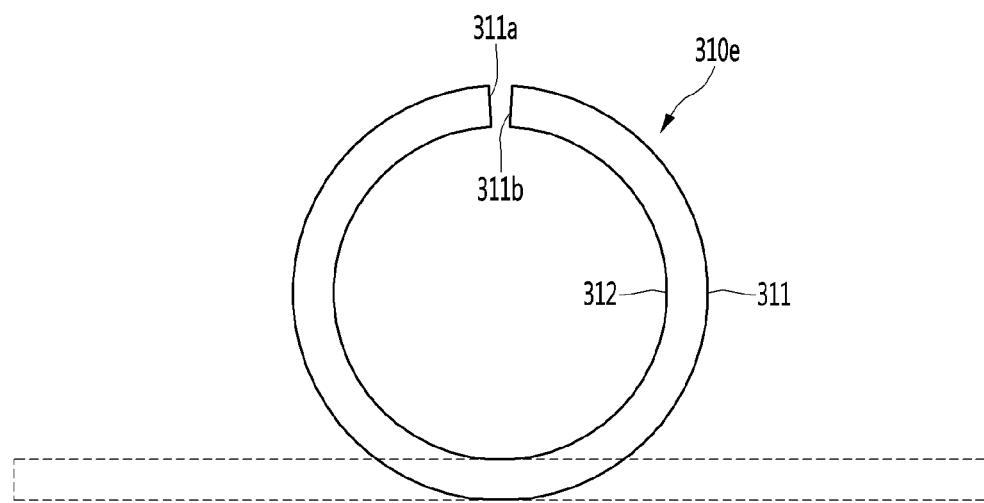

[FIG. 11]
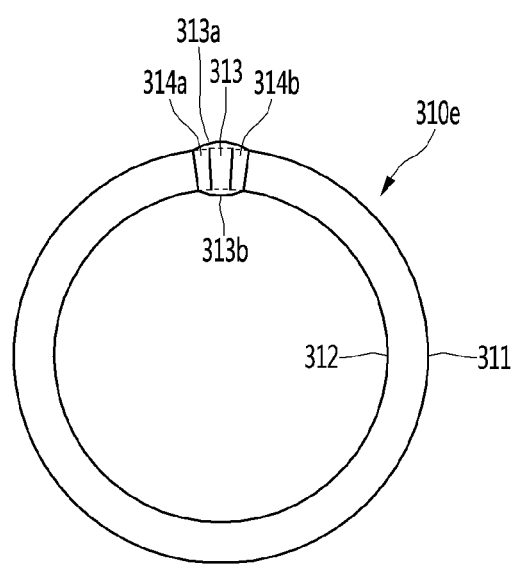

[FIG. 12]
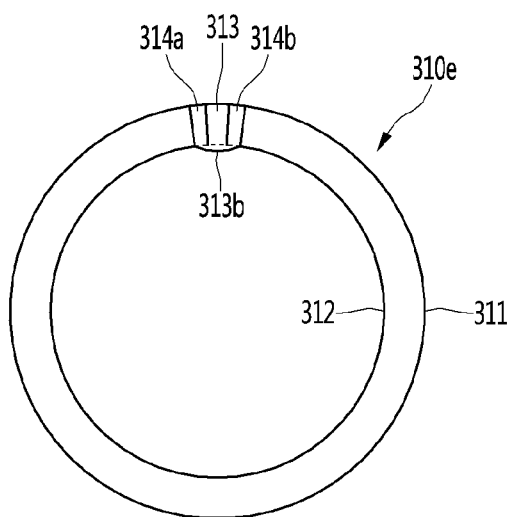

[FIG. 13]
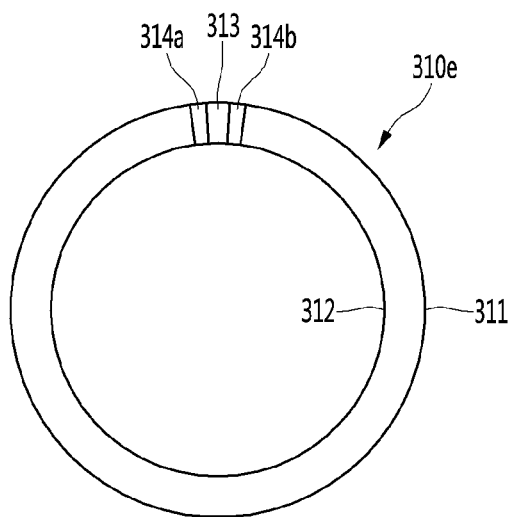

[FIG. 14]
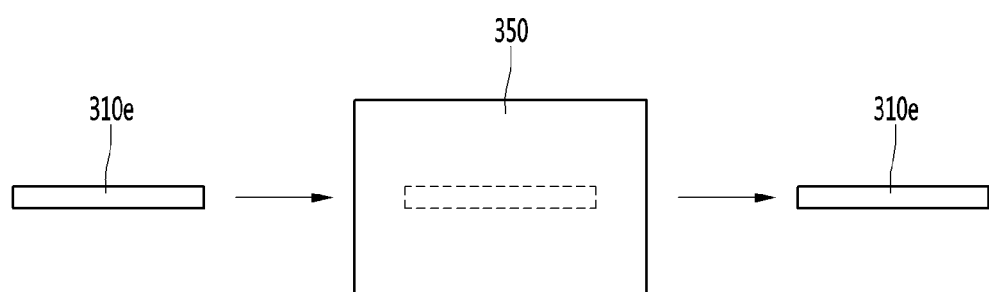

[FIG. 15]
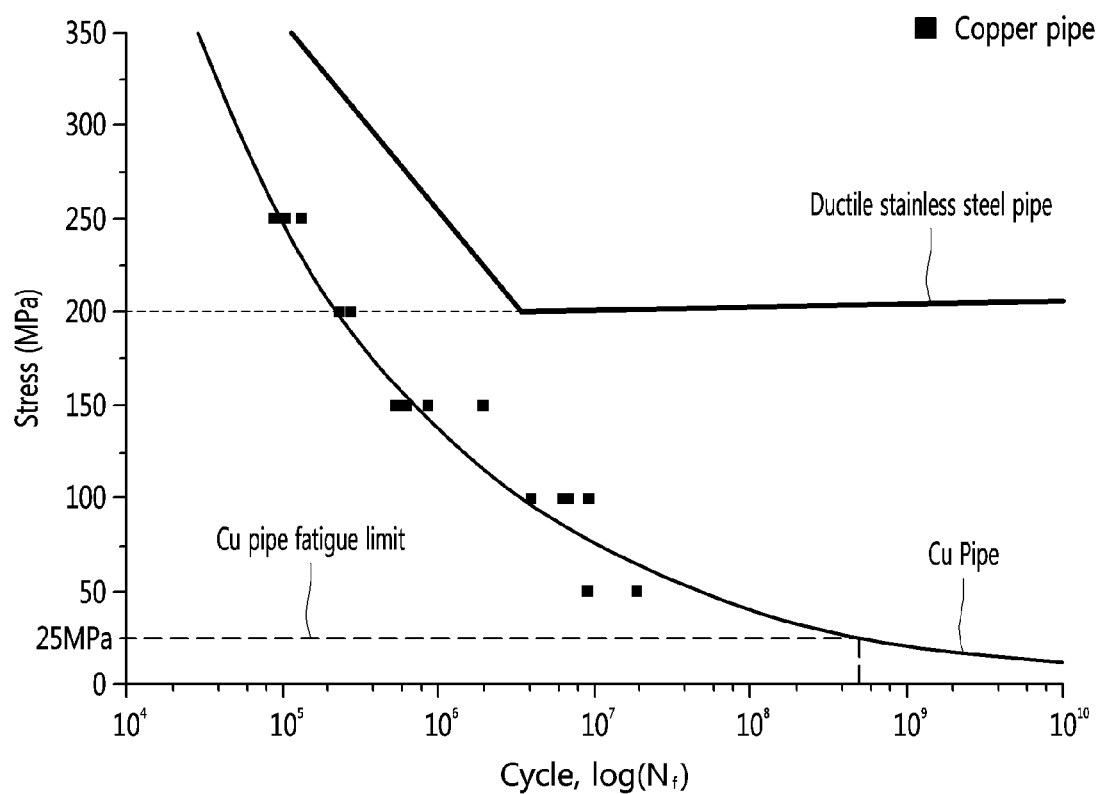

[FIG. 16]
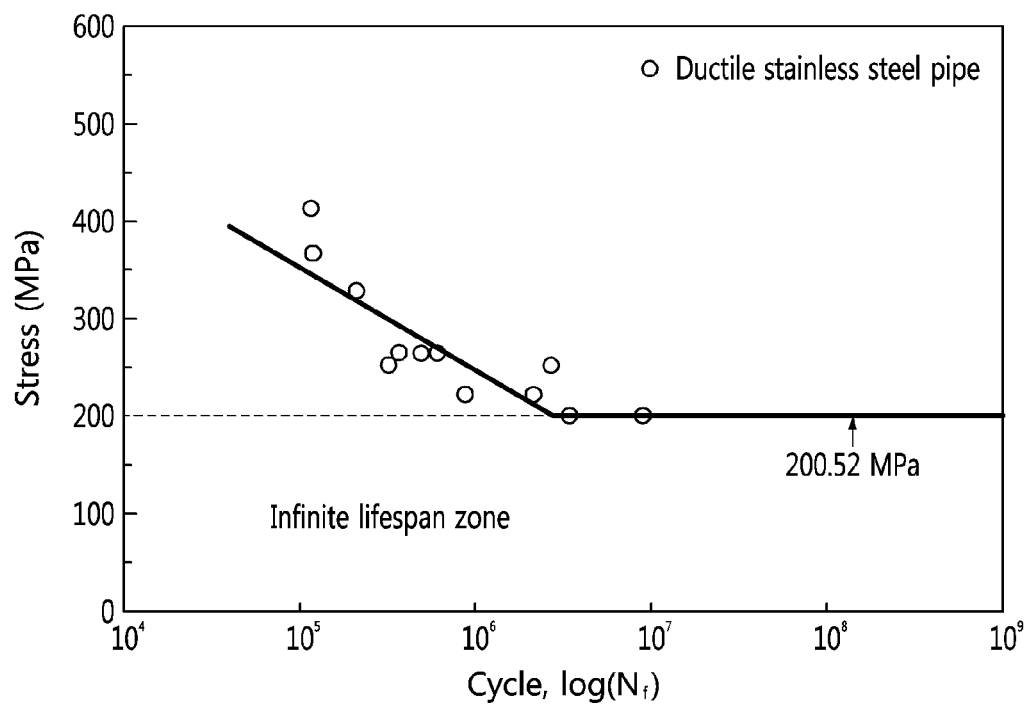

[FIG. 17]
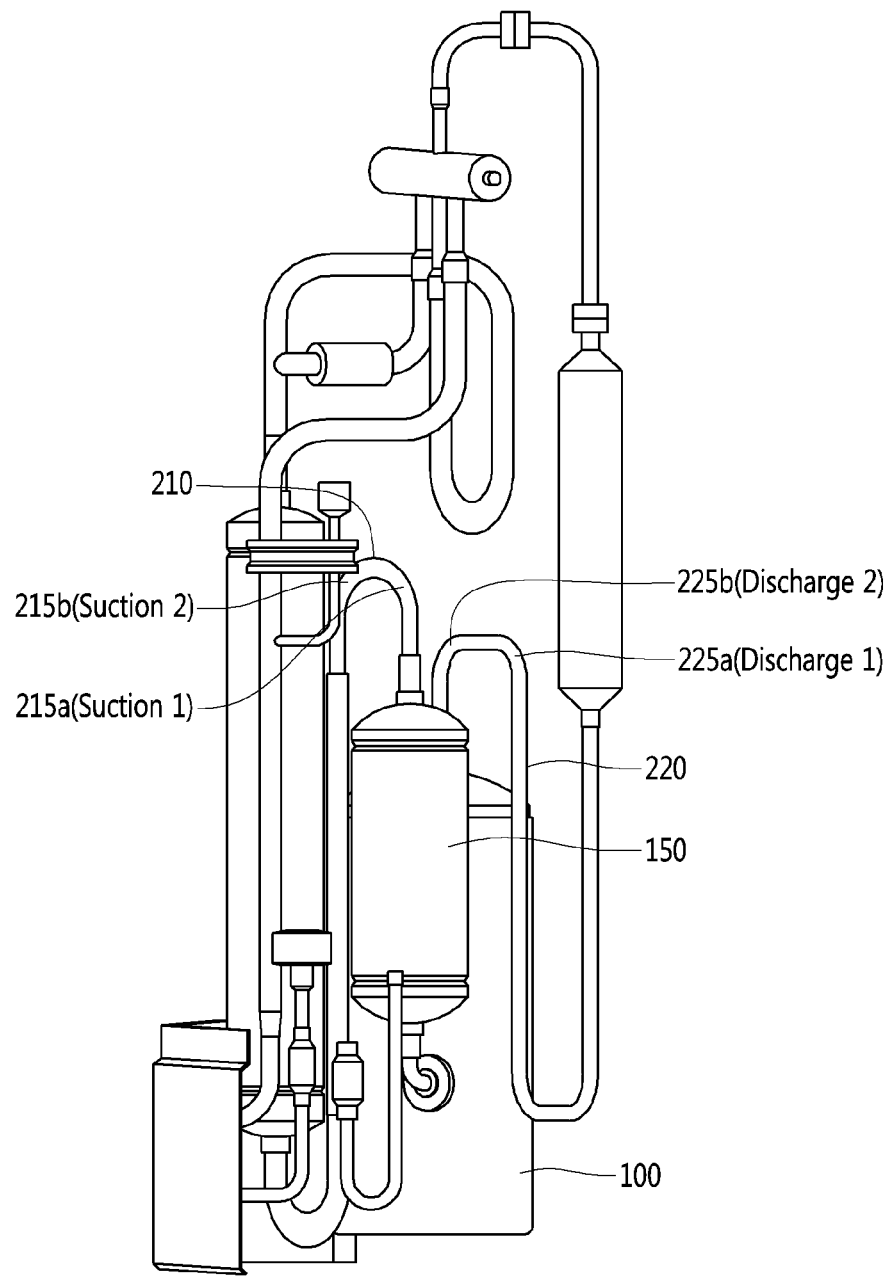

| Classification | | | Discharge | | Suction | |
|---|---|---|---|---|---|---|
| | | | 1 | 2 | 1 | 2 |
| Cooling standard | Start | Cu | 1.6 | 2.6 | | 1.7 |
| | | STS | 8.0 | 19.2 | 13.2 | 4.1 |
| | Operation | Cu | 8.2 | 5.2 | | 4.1 |
| | | STS | 19.0 | 12.4 | 13.1 | 4.0 |
| | Stop | Cu | 19.7 | 17.0 | | 15.4 |
| | | STS | 26.2 | 38.7 | 16.9 | 13.8 |

(b)

| Classification | | | Discharge | | Suction | |
|---|---|---|---|---|---|---|
| | | | 1 | 2 | 1 | 2 |
| Heating standard | Start | Cu | 3.1 | 4.9 | | 3.1 |
| | | STS | 3.0 | 5.6 | 1.8 | 0.4 |
| | Operation | Cu | 8.7 | 3.4 | | 3.7 |
| | | STS | 23.2 | 11.0 | 7.8 | 2.7 |
| | Stop | Cu | 13.9 | 12.0 | | 11.4 |
| | | STS | 25.6 | 34.3 | 17.2 | 9.9 |

| Classification | | | Discharge | | Suction | |
|---|---|---|---|---|---|---|
| | | | 1 | 2 | 1 | 2 |
| Cooling overload | Start | Cu | 2.1 | 3.6 | | 1.5 |
| | | STS | 3.0 | 4.1 | 2.9 | 0.6 |
| | Operation | Cu | 9.6 | 4.7 | | 2.8 |
| | | STS | 11.8 | 20.8 | 8.4 | 6.2 |
| | Stop | Cu | 19.3 | 29.1 | | 24.3 |
| | | STS | 20.8 | 35.0 | 15.0 | 15.7 |

(b)

| Classification | | | Discharge | | Suction | |
|---|---|---|---|---|---|---|
| | | | 1 | 2 | 1 | 2 |
| Heating overload | Start | Cu | 2.5 | 3.9 | | 1.9 |
| | | STS | 2.7 | 4.3 | 2.5 | 0.6 |
| | Operation | Cu | 7.2 | 3.1 | | 2.5 |
| | | STS | 20.6 | 12.4 | 6.9 | 4.1 |
| | Stop | Cu | 14.6 | 23.1 | | 21.6 |
| | | STS | 21.3 | 35.3 | 18.9 | 15.6 |

[FIG. 20]
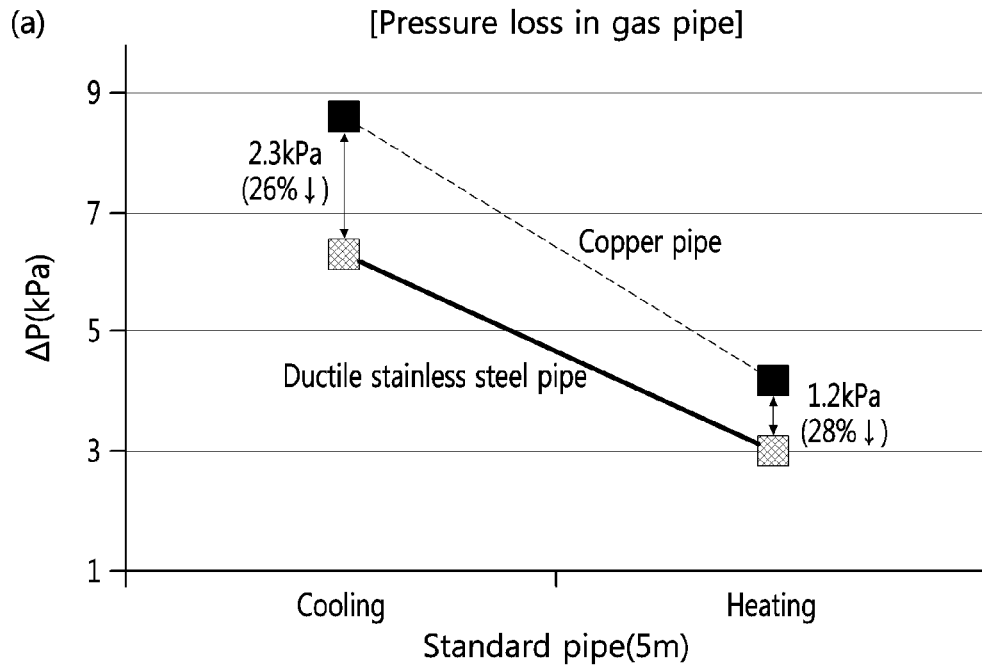
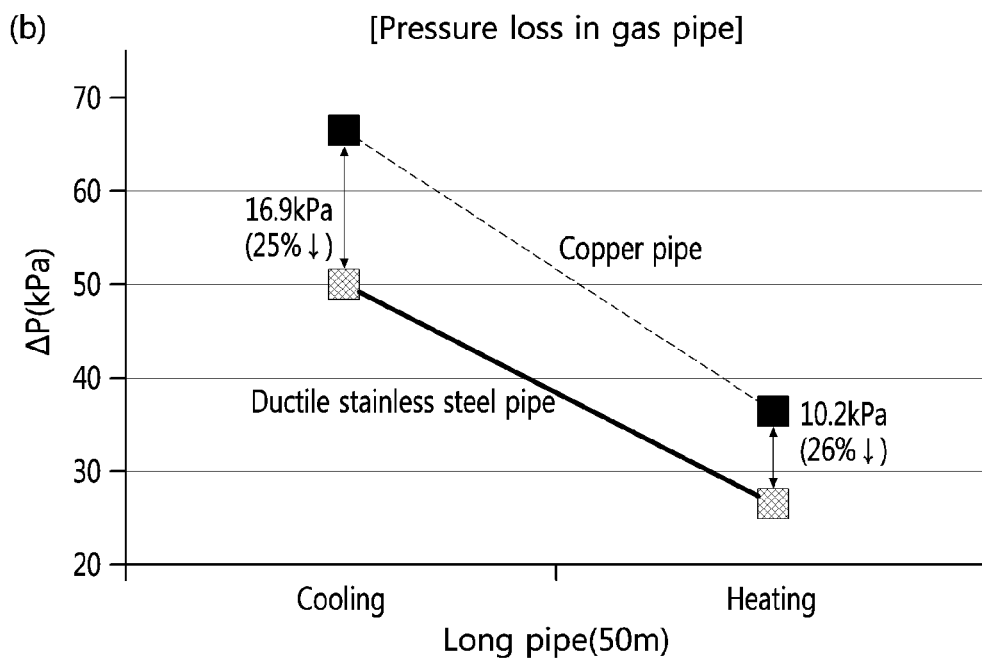

| 5m standard | Cooling | | Heating | |
|---|---|---|---|---|
| Classification | Copper pipe(Cu) | Ductile stainless steel pipe | Copper pipe(Cu) | Ductile stainless steel pipe |
| Capacity(kW) | 9.36 | 9.45 (100.9%) | 11.28 | 11.31 (100.2%) |
| Power consumption(kW) | 2.07 | 2.06 (100.0%) | 2.55 | 2.55 (100.0%) |
| Efficiency | 4.53 | 4.58 (100.9%) | 4.43 | 4.44 (100.2%) |

(b)

| 50m long pipe | Cooling | | Heating | |
|---|---|---|---|---|
| Classification | Copper pipe(Cu) | Ductile stainless steel pipe | Copper pipe(Cu) | Ductile stainless steel pipe |
| Capacity(kW) | 7.77kW | 8.03 (103.4%) | 8.92 | 9.07 (101.7%) |
| Power consumption(kW) | 2.08kW | 2.08 (100.2%) | 2.54 | 2.53 (99.7%) |
| Efficiency | 3.74 | 3.86 (103.2%) | 3.51 | 3.58 (102.0%) |

[FIG. 22]
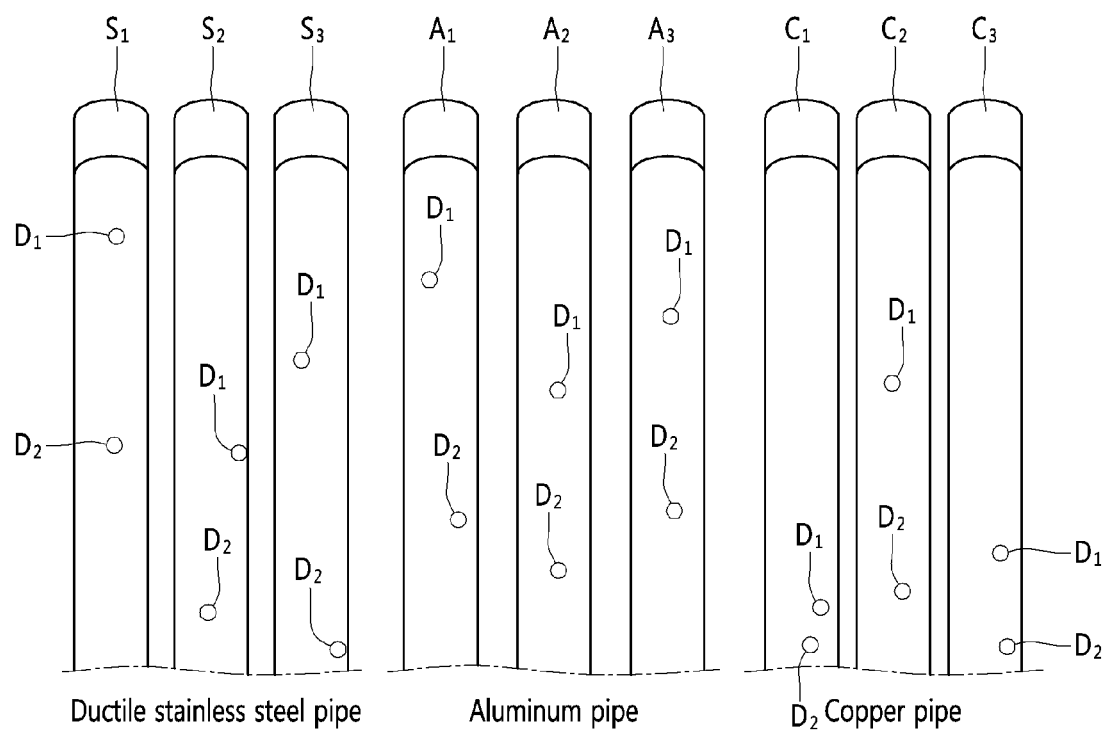

[FIG. 23]

| | Corrosion depth (μm) | | | | | | Average | Maximum | Divation |
|---|---|---|---|---|---|---|---|---|---|
| Smaple number | 1 | | 2 | | 3 | | | | |
| Measurement position | 1 | 2 | 1 | 2 | 1 | 2 | | | |
| Ductile stainless steel pipe | 8 | 9 | 26 | 25 | 36 | 9 | 19 | 36 | 12 |
| Copper pipe | 16 | 16 | 49 | 8 | 28 | 17 | 22 | 49 | 15 |
| Aluminum pipe | 91 | 64 | 95 | 105 | 104 | 110 | 95 | 110 | 17 |

[FIG. 24]
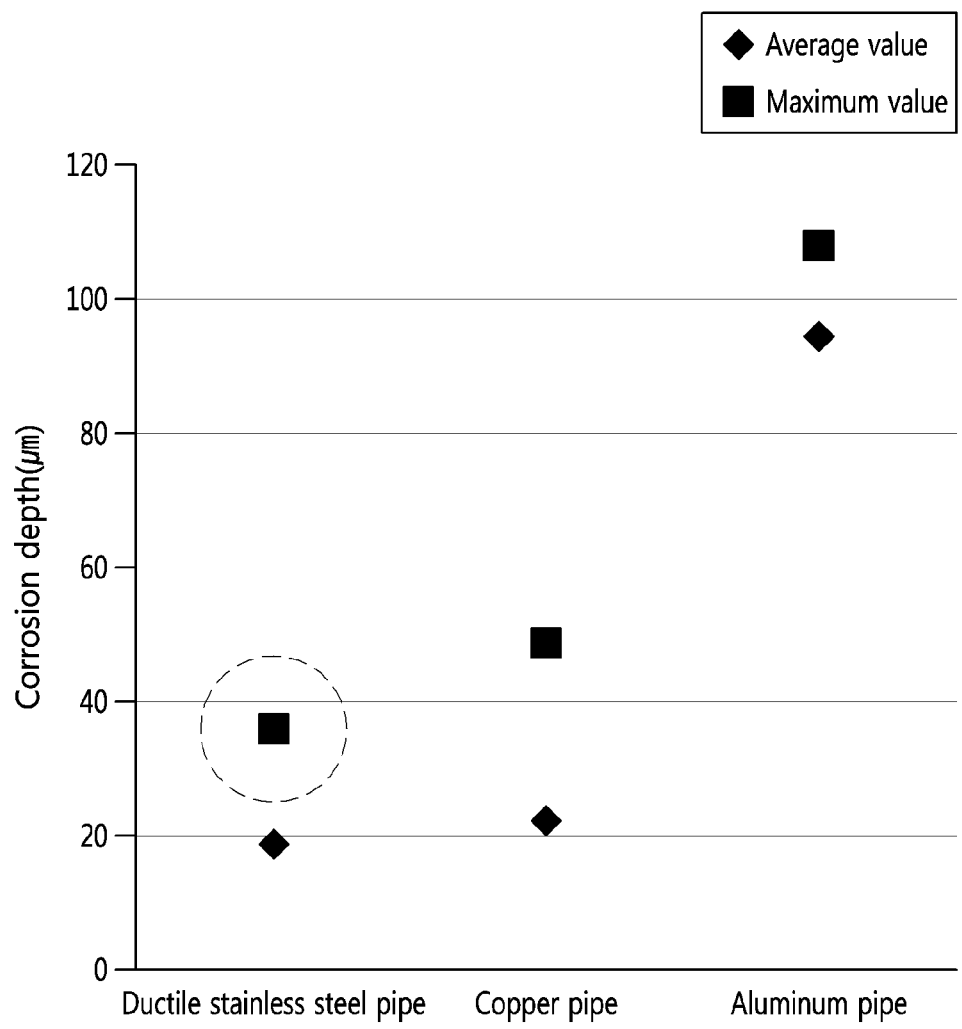

[FIG. 25]
(a)
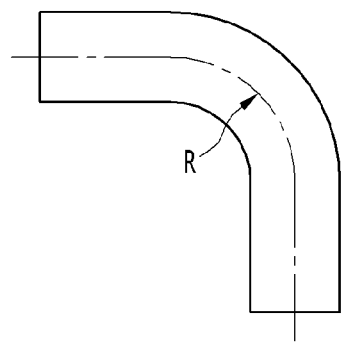
(b)
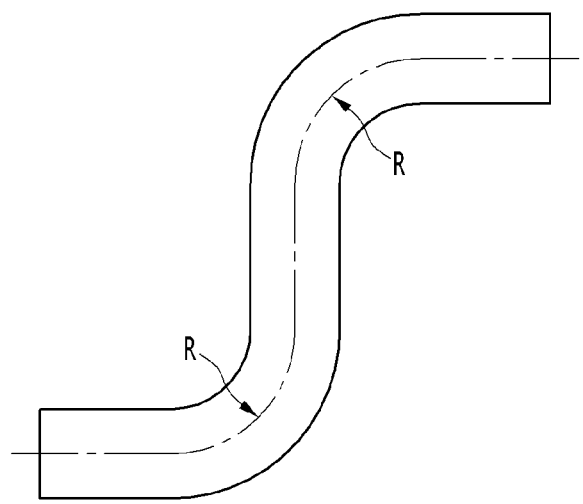

[FIG. 26]
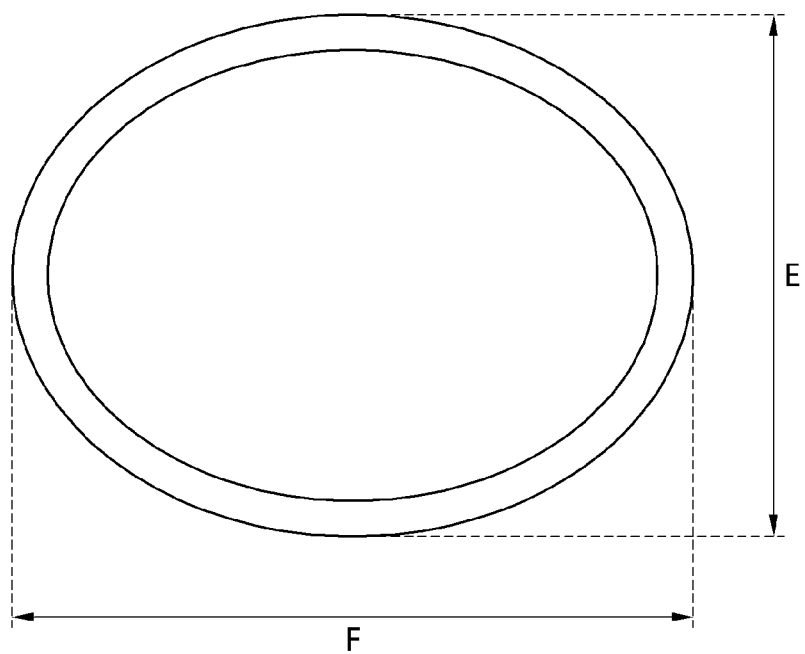

[FIG. 27]
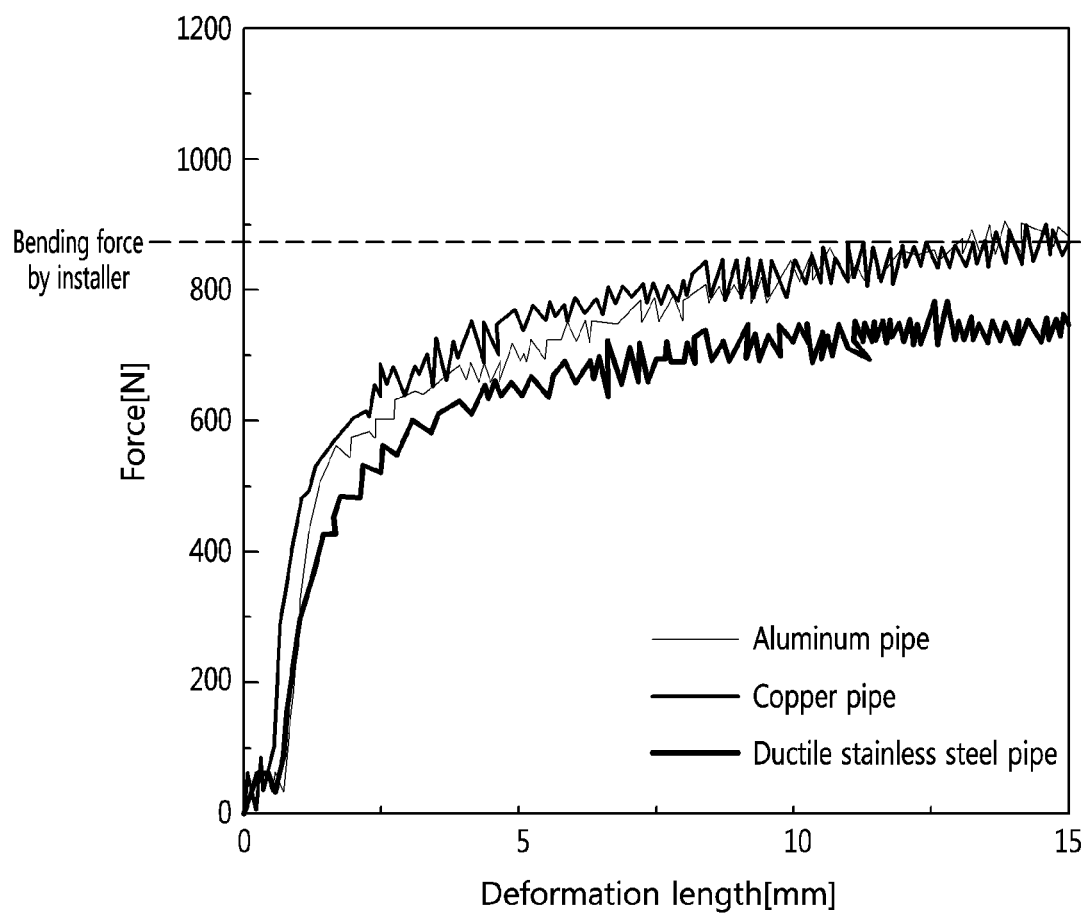

[FIG. 28]
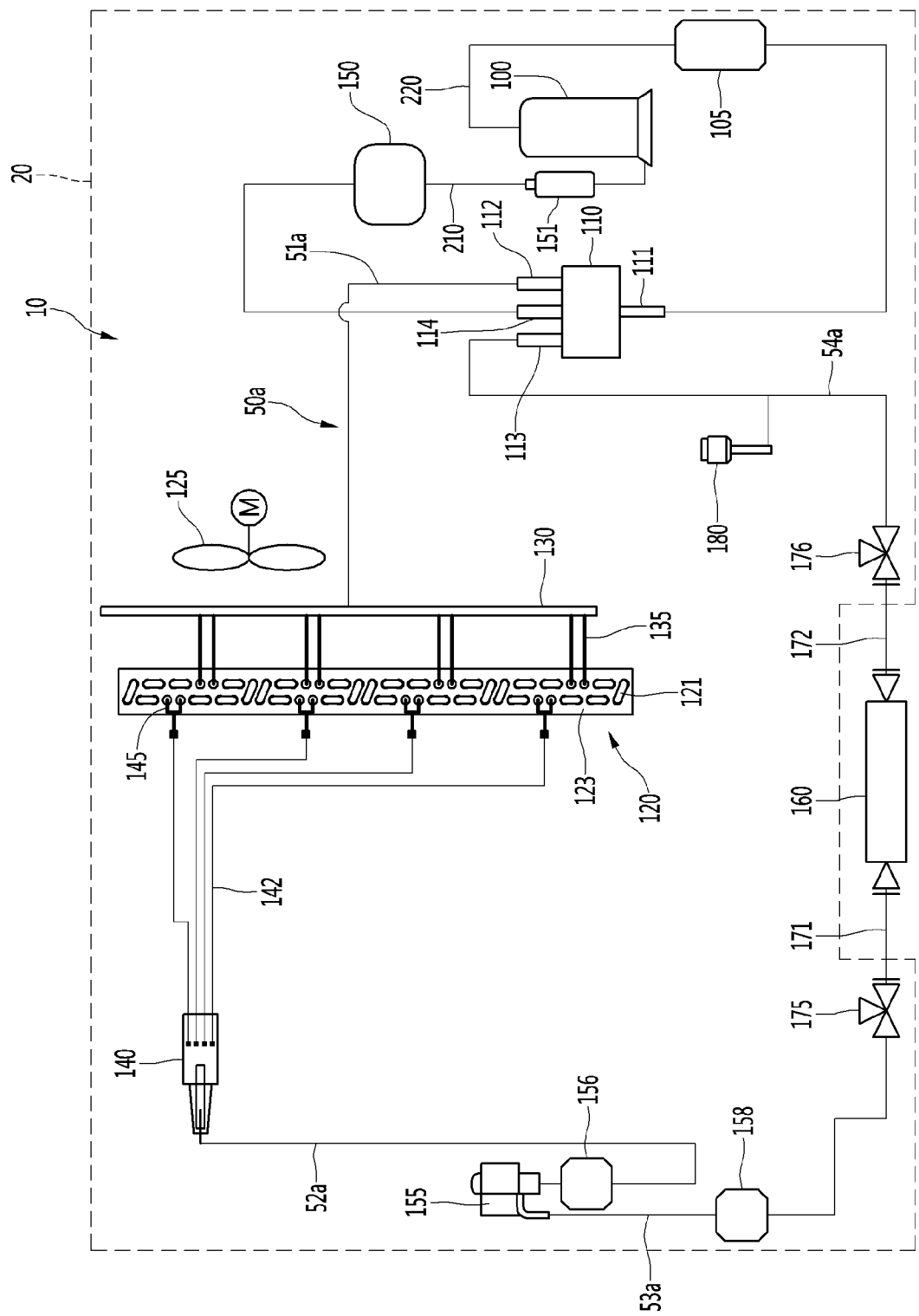

AIR CONDITIONER

This application is a National Stage Application of International Application No. PCT/KR2018/000563, filed on Jan. 11, 2018, which claims the benefit of Korean Patent Application No. 10-2017-0031383, filed on Mar. 13, 2017, all of which are hereby incorporated by reference in their entirety for all purposes as if fully set forth herein.

TECHNICAL FIELD

The present invention relates to an air conditioner.

BACKGROUND ART

Air conditioners may be defined as devices for supplying warm air or cold air to an indoor space by using a phase change cycle of a refrigerant.

In detail, the phase change cycle of the refrigerant may include a compressor compressing a low-temperature low-pressure gas refrigerant to change into a high-temperature high-pressure gas refrigerant, a condenser allowing the high-temperature high-pressure gas refrigerant compressed in the compressor to phase-change into a high-temperature high-pressure liquid refrigerant, an expansion valve expanding the high-temperature high-pressure liquid refrigerant passing through the condenser to change into a low-temperature low-pressure two-phase refrigerant, and an evaporator allowing the low-temperature low-pressure two-phase refrigerant passing through the expansion valve to phase-change into a low-temperature low-pressure gas refrigerant.

When the phase change cycle of the refrigerant operates as a device for supplying cold air, the condenser is disposed in an outdoor space, and the evaporator is disposed in an indoor space. Also, the compressor, the condenser, the expansion valve, and the evaporator are connected to each other through a refrigerant pipe to form a closed refrigerant circulation loop.

In general, a copper (Cu) pipe made of a copper material is widely used as the refrigerant pipe. However, the copper pipe has some limitations as follows.

First, when the copper pipe is used in a total heat exchanger in which water is used as a refrigerant, scales are accumulated on an inner circumferential surface of the pipe to deteriorate reliability of the pipe. That is, when the scales are accumulated on the inner circumferential surface of the copper pipe, it is necessary to perform a cleaning process for cleaning the inner circumferential surface of the pipe or a pipe replacement process.

Second, there is a disadvantage that the copper pipe does not have sufficient pressure resistance characteristics for withstanding a high pressure. Particularly, when the copper pipe is applied to a refrigerant circulation cycle to which a refrigerant compressed at a high pressure by a compressor, i.e., a new refrigerant such as R410a, R22, and R32 is applied, as an operating time of the refrigerant cycle is accumulated, the cooper pipe may not withstand the high pressure and thus be damaged.

Third, since the copper pipe has a small stress margin value for withstanding a pressure of the refrigerant in the pipe, it is vulnerable to vibration transmitted from the compressor. For this reason, to absorb the vibration transmitted to the copper pipe and the resultant noise, the pipe is lengthened in length and disposed to be bent in x, y, and z axis directions. As a result, since an installation space for accommodating the copper pipe is not sufficient in an outdoor unit of an air conditioner or a washing machine using a heat pump, it is difficult to install the pipe.

Also, since copper prices are relatively high in the market, and price fluctuations are so severe, it is difficult to use the copper pipe. In recent years, to solve these limitations, a new method for replacing the copper pipe with a stainless steel pipe is emerging.

The stainless steel pipe is made of a stainless steel material, has strong corrosion resistance when compared to the copper pipe, and is less expensive than that of the copper pipe. Also, since the stainless steel pipe has strength and hardness greater than those of the copper pipe, vibration and noise absorption capacity may be superior to that of the copper pipe.

Also, since the stainless steel pipe has pressure resistance characteristics superior to those of the copper pipe, there is no risk of damage even at the high pressure. However, since the stainless steel pipe according to the related art has excessively high strength and hardness when compared to the copper pipe, it is disadvantageous to an expansion operation for pipe connection or a pipe bending operation. Particularly, the pipe constituting the refrigerant cycle may be disposed in a shape that is bent at a specific curvature at a specific point. However, when the stainless steel pipe according to the related art is used, it is impossible to bend the pipe.

DISCLOSURE OF THE INVENTION

Technical Problem

To solve the above problems, an object of the present invention is to provide an air conditioner including a refrigerant pipe which is improved in workability by securing ductility at a level of a copper pipe.

An object of the present invention is to provide an air conditioner including a refrigerant pipe having strength and hardness equal to or higher than those of a copper pipe.

An object of the present invention is to provide an air conditioner including a refrigerant pipe which is capable of preventing the pipe from corroded by a refrigerant pressure condition inside the pipe or an environmental condition outside the pipe.

An object of the present invention is to provide an air conditioner including a refrigerant pipe which is capable of maintaining a critical pressure above a predetermined level even if the pipe is reduced in thickness.

An object of the present invention is to provide an air conditioner including a refrigerant pipe which increases in inner diameter to reduce a pressure loss of a refrigerant flowing in the pipe.

An object of the present invention is to provide an air conditioner including a refrigerant pipe which is improved in vibration absorption capacity. Particularly, an object of the present invention is to provide an air conditioner including a refrigerant pipe which is capable of effectively absorbing vibration transmitted from a compressor to reduce a length of the refrigerant pipe.

An object of the present invention is to provide an air conditioner including a refrigerant pipe which is capable of being determined in outer diameter of the refrigerant pipe according to air-conditioning capacity determined based on capacity of a compressor.

An object of the present invention is to provide an air conditioner including a refrigerant pipe which is capable of determining an inner diameter of the refrigerant pipe on the basis of a thickness of the pipe, which is determined according to a determined outer diameter of refrigerant pipe and a kind of refrigerant.

Technical Solution

To solve the above problems, in the first invention according to this embodiment, an air conditioner has refrigeration capacity of 16 kW to 28 kW, a mixed refrigerant R134a is used as a refrigerant, and the refrigerant pipe includes a ductile stainless steel having a delta ferrite matrix structure of 1% or less on the basis of a grain area.

The ductile stainless steel pipe has an austenite matrix structure and an average grain diameter of 30 μm to 60 μm, and an ASTM (American Society for Testing and Materials) grain size number of the ductile stainless steel pipe is 5.0 to 7.0.

The air conditioner may further include a suction pipe that guides suction of a refrigerant into a compressor and has an outer diameter of 22.20 mm and a discharge pipe that guides discharge of the refrigerant compressed in the compressor and has an outer diameter of 15.88 mm, wherein the suction pipe may have an inner diameter of 21.54 mm or less, and the discharge pipe may have an inner diameter of 15.38 mm or less.

The air conditioner may further include a suction pipe that guides suction of a refrigerant into a compressor and has an outer diameter of 22.20 mm and a discharge pipe that guides discharge of the refrigerant compressed in the compressor and has an outer diameter of 12.70 mm, wherein the suction pipe may have an inner diameter of 21.54 mm or less, and the discharge pipe may have an inner diameter of 12.30 mm or less.

The air conditioner may further include the refrigerant pipe including a suction pipe that guides suction of a refrigerant into a compressor and has an outer diameter of 22.20 mm and a discharge pipe that guides discharge of the refrigerant compressed in the compressor and has an outer diameter of 19.05 mm, wherein the suction pipe may have an inner diameter of 21.54 mm or less, and the discharge pipe may have an inner diameter of 18.47 mm or less.

The air conditioner may further include a suction pipe that guides suction of a refrigerant into a compressor and has an outer diameter of 19.05 mm and a discharge pipe that guides discharge of the refrigerant compressed in the compressor and has an outer diameter of 15.88 mm, wherein the suction pipe may have an inner diameter of 18.47 mm or less, and the discharge pipe may have an inner diameter of 15.38 mm or less.

The air conditioner may further include a suction pipe that guides suction of a refrigerant into a compressor and has an outer diameter of 19.05 mm and a discharge pipe that guides discharge of the refrigerant compressed in the compressor and has an outer diameter of 12.70 mm, wherein the suction pipe may have an inner diameter of 18.47 mm or less, and the discharge pipe may have an inner diameter of 12.30 mm or less.

The air conditioner may further include a suction pipe that guides suction of a refrigerant into a compressor and has an outer diameter of 19.05 mm and a discharge pipe that guides discharge of the refrigerant compressed in the compressor and has an outer diameter of 19.05 mm, wherein the suction pipe may have an inner diameter of 18.47 mm or less, and the discharge pipe may have an inner diameter of 18.47 mm or less.

The air conditioner may further include a suction pipe that guides suction of a refrigerant into a compressor and has an outer diameter of 25.40 mm and a discharge pipe that guides discharge of the refrigerant compressed in the compressor and has an outer diameter of 15.88 mm, wherein the suction pipe may have an inner diameter of 24.68 mm or less, and the discharge pipe may have an inner diameter of 15.38 mm or less.

The air conditioner may further include a suction pipe that guides suction of a refrigerant into a compressor and has an outer diameter of 25.40 mm and a discharge pipe that guides discharge of the refrigerant compressed in the compressor and has an outer diameter of 12.70 mm, wherein the suction pipe may have an inner diameter of 24.68 mm or less, and the discharge pipe may have an inner diameter of 12.30 mm or less.

The air conditioner may further include a suction pipe that guides suction of a refrigerant into a compressor and has an outer diameter of 25.40 mm and a discharge pipe that guides discharge of the refrigerant compressed in the compressor and has an outer diameter of 19.05 mm, wherein the suction pipe may have an inner diameter of 24.68 mm or less, and the discharge pipe may have an inner diameter of 18.47 mm or less.

Advantageous Effects

The air conditioner having the above-described configuration may have following effects.

The refrigerant that is capable of satisfying the refrigeration capacity of the air conditioner may be used to improve the operation efficiency of the air conditioner.

Also, the austenite type stainless steel pipe may be applied to secure ductility at the level of the copper tube when compared to the stainless steel pipe according to the related art, and thus, the bent stainless steel pipe may be applied to the refrigerant circulation cycle. That is, the degree of freedom of forming the refrigerant pipe may increase when compared to the stainless steel pipe according to the related art. Also, the relatively inexpensive ductile stainless steel pipe may be used without using expensive copper pipe.

Since the ductile stainless steel pipe according to this embodiment has the strength and the hardness greater than those of the copper pipe while having the ductility at the level of the copper pipe, the pressure resistance may be remarkably superior to that of the copper pipe, and various kinds of new refrigerants having the high saturated vapor pressure may be used in the refrigerant cycle. There is an advantage that the so-called degree of freedom of the refrigerant increases.

Also, since the stainless steel pipe having the strength and the hardness greater than those of the copper pipe has a stress margin greater than that of the copper pipe, the vibration absorption capability may be remarkably superior to that of the copper pipe. That is to say, in case of the stainless steel pipe, it is unnecessary to lengthen the pipe so as to absorb the vibration and the noise, it may be unnecessary to bend the pipe several times. Thus, it may be easy to secure the spaced for installing the refrigerant cycle, and the manufacturing cost may be reduced by reducing the length of the pipe.

Also, since the ductility of the ductile stainless steel pipe according to this embodiment is improved, the workability of the pipe may increase. Also, since the ductile stainless steel pipe has corrosion resistance superior to that of the copper pipe, the lifespan of the pipe may be prolonged.

Since the suction pipe disposed adjacent to the compressor may be improved in strength to prevent the suction pipe from being vibrated and damaged. Also, since the ductility of the suction pipe increases, the suction pipe may be processed (bent) and thus easily installed in the limited space.

Also, since the suction pipe constituting the ductile stainless has the strength greater than that of the copper pipe while securing the ductility at the level of the copper pipe, the pipe may be reduced in thickness. That is, even if the pipe has a thickness less than that of the copper pipe, the limit pressure of the pipe may be maintained to reduce the thickness of the pipe.

Since the discharge pipe disposed at the discharge side of the compressor to allow the high-pressure refrigerant to flow therethrough may be improved in strength to prevent the discharge pipe from being vibrated and damaged. Also, since the ductility of the discharge pipe increases, the suction pipe may be machined (bent) and thus easily installed in the limited space.

Also, since the discharge pipe constituting the ductile stainless has the strength greater than that of the copper pipe while securing the ductility at the level of the copper pipe, the pipe may be reduced in thickness. That is, even if the pipe has a thickness less than that of the copper pipe, the limit pressure of the pipe may be maintained to reduce the thickness of the pipe.

As a result, the suction/discharge pipes may increase in inner diameter under the same outer diameter as the copper pipe, and the pressure loss of the refrigerant flowing through the pipe may be reduced due to the increase of the inner diameter. As the pressure loss within the pipe decreases, the flow rate of the refrigerant may increase to improve the coefficient of performance (COP) of the refrigerant cycle.

The outer diameter and the thickness of each of the first to fourth refrigerant pipes provided in the air conditioner may be provided within the optimum range to maintain the strength and the ductility of the pipe to the preset level or more. Therefore, the installation convenience of the pipe may be improved.

BRIEF DESCRIPTION OF THE DRAWINGS

FIG. 1 is a refrigeration cycle diagram of an air conditioner according to a first embodiment of the present invention.

FIG. 2 is a view illustrating a suction pipe and a discharge pipe of a compressor according to the first embodiment of the present invention.

FIG. 3 is a microstructure photograph of a stainless steel having an austenite matrix structure of about 99% and a delta ferrite structure of about 1% or less.

FIG. 4 is a microstructure photograph of a stainless steel having only the austenite matrix structure.

FIG. 5 is a view illustrating an outer diameter and an inner diameter of a refrigerant pipe according to the first embodiment of the present invention.

FIG. 6 is a flowchart illustrating a method for manufacturing the ductile stainless steel pipe according to the first embodiment of the present invention.

FIG. 7 is a schematic view of a cold rolling process of FIG. 6.

FIG. 8 is a schematic view of a slitting process of FIG. 6.

FIG. 9 is a schematic view of a forming process of FIG. 6.

FIGS. 10 to 13 are cross-sectional views illustrating a process of manufacturing a ductile stainless steel pipe according to the manufacturing method of FIG. 6.

FIG. 14 is a schematic view of a bright annealing process of FIG. 6.

FIG. 15 is a graph illustrating result values obtained through an S-N curve test for comparing fatigue limits of the ductile stainless steel pipe according to the first embodiment of the present invention and a copper pipe according to the related art.

FIG. 16 is a graph illustrating an S-N curve teat of the ductile stainless steel pipe according to the first embodiment of the present invention.

FIG. 17 is a view illustrating an attachment position of a stress measurement sensor for measuring stress of the pipe.

FIGS. 18 and 19 are test data tables illustrating result values measured by the stress measurement sensor of FIG. 17.

FIG. 20 is a graph illustrating result values obtained through a test for comparing pressure losses within the pipes when each of the ductile stainless steel pipe according to the first embodiment of the present invention and the copper pipe according to the related art is used as a gas pipe.

FIG. 21 is a test result table illustrating performance of the ductile stainless steel pipe according to the first embodiment of the present invention and the copper pipe according to the related art.

FIG. 22 is a view illustrating a plurality of ductile stainless steel pipes, aluminum (Al) pipes, and copper pipes, which are objects to be tested for corrosion resistance.

FIG. 23 is a table illustrating results obtained by measuring a corrosion depth for each pipe in FIG. 22.

FIG. 24 is a graph illustrating results of FIG. 23.

FIG. 25 is view illustrating a shape in which the ductile stainless steel pipe is bent according to an embodiment of the present invention.

FIG. 26 is a cross-sectional view illustrating a portion of the bent pipe.

FIG. 27 is a graph illustrating results obtained through a test for comparing bending loads according to deformation lengths of the ductile stainless steel pipe, the copper pipe, and the aluminum pipe.

FIG. 28 is a refrigeration cycle diagram of an air conditioner according to a second embodiment of the present invention.

MODE FOR CARRYING OUT THE INVENTION

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

FIG. 1 is a refrigeration cycle diagram of an air conditioner according to a first embodiment of the present invention, and FIG. 2 is a view illustrating a suction pipe and a discharge pipe of a compressor according to the first embodiment of the present invention.

<Configuration of Outdoor Unit>

Referring to FIG. 1, an air conditioner 10 according to the first embodiment of the present invention includes an outdoor unit 20 and an indoor unit 160 to operate a refrigerant cycle in which a refrigerant circulates. First, a configuration of the outdoor unit 20 will be described.

[Compressor]

Referring to FIG. 1, the air according to the first embodiment of the present invention includes a compressor 100 compressing the refrigerant. Refrigeration capability, i.e., air-conditioning capability of the air conditioner 10 may be determined based on compressibility of the compressor 100. The air-conditioning capability may include cooling capability or heating capability. The air conditioner 10 according to this embodiment may have air-conditioning capability ranging of about 16 kW to about 28 kW.

For example, the air conditioner may have cooling rated capacity of about 16.0 kW. Also, the air conditioner may have heating rated capacity of about 18.0 kW.

For another example, the air conditioner may have cooling rated capacity of about 22.4 kW. Also, the air conditioner may have heating rated capacity of about 25.2 kW.

For another example, the air conditioner may have cooling rated capacity of about 28 kW.

The compressor 100 includes a rotary-type inverter compressor. For example, the compressor 100 includes a twin rotary compressor. The compressor may have a motor output frequency of about 60 Hz.

[Muffler]

The air conditioner 10 further includes a muffler 105 disposed at an outlet side of the compressor 100. The muffler 105 may reduce noise generated from a high-pressure refrigerant discharged from the compressor 100. The muffler 105 includes a chamber for increasing a flow cross-sectional area of the refrigerant, and the chamber defines a resonance chamber.

[Flow Control Valve]

The air conditioner 10 further include a flow control valve 110 disposed at an outlet side of the muffler 105 to convert a flow direction of the refrigerant compressed in the compressor 100.

For example, the flow control valve 110 may include a four-way valve. In detail, the flow control valve 110 includes a plurality of ports. The plurality of ports include a first port 111 into which a high-pressure refrigerant compressed in the compressor 100 is introduced, a second port 112 connected to a pipe extending from the flow control valve 110 to an outdoor heat exchanger, a third port 113 connected to a pipe extending from the flow control valve 110 to the indoor unit 160, and a fourth port 114 extending from the flow control valve 110 to gas/liquid separator 150.

[Operation of Flow Control Valve During Cooling/Heating Operation]

The refrigerant compressed in the compressor 100 may pass through the muffler 105 and then be introduced into the flow control valve 110 through the first port 111 of the flow control valve 110.

When the air conditioner 10 performs a cooling operation, the refrigerant introduced into the flow control valve 110 may flow to the outdoor heat exchanger 120. For example, the refrigerant may be discharged from the second port 112 of the flow control valve 110 and then introduced into the outdoor heat exchanger 120.

On the other hand, when the air conditioner 10 performs a heating operation, the refrigerant introduced into the flow control valve 110 may flow to the indoor unit 160. For example, the refrigerant may be discharged from the third port 113 of the flow control valve 110 and then introduced to the indoor unit 160.

[Outdoor Heat Exchanger]

The air conditioner 10 further includes an outdoor heat exchanger 120 heat-exchanged with external air. The outdoor heat exchanger 120 is disposed at an outlet side of the flow control valve 110.

The outdoor heat exchanger 120 further includes a heat exchange pipe 121 and a holder 123 supporting the heat exchange pipe 121. The holder 123 may support both sides of the heat exchange pipe 121. Although not shown in the drawings, the outdoor heat exchanger 120 further includes a heat exchange pin coupled to the heat exchange pipe 121 to assist the heat-exchange with the external air.

[Manifold and Connection Pipe]

The air conditioner 10 further includes a manifold 130 connected to the first port of the flow control valve 110. The manifold 130 is disposed at one side of the outdoor heat exchanger 120 and configured to allow the refrigerant to be introduced into a plurality of passages of the outdoor heat exchangers 120 during the cooling operation and allow the refrigerant passing through the outdoor heat exchanger 120 to be collected.

The air conditioner 10 includes a plurality of connection pipes 135 extending from the manifold 130 to the outdoor heat exchanger 120. The plurality of connection pipes 135 may be disposed spaced apart from each other from an upper portion to a lower portion of the manifold 130.

[Distributor]

A distributor 140 is disposed at one side of the outdoor heat exchanger 120. The distributor 140 may be configured to . . . The refrigerant compressed in the compressor 140 may be branched into the first outdoor heat exchange part 111 and the bypass tube 124 through the passage switching part 120 to flow.

[Capillary and Branch Pipe]

The air conditioner 10 further includes a plurality of capillaries 142 extending from the distributor 140 to the outdoor heat exchanger 120. Each of the capillaries 142 may be connected to the branch pipe 145.

The branch pipe 145 may be coupled to the outdoor heat exchanger 120. For example, the branch pipe 145 may have a Y shape and be coupled to a heat exchange pipe 121 of the outdoor heat exchanger 120. A plurality of branch pipes 145 may be provided to correspond to the plurality of capillaries 142.

[Expansion Device and Strainer]

The air conditioner 10 further includes a main expansion device 155 decompressing the refrigerant condensed in the indoor unit 160. For example, the main expansion device 130 may include an electronic expansion valve (EEV) of which an opening degree is adjustable.

Strainers 156 and 158 separating foreign substances from the refrigerant are further provided at one side of the expansion device 155. The strainers 156 and 158 may be provided in plurality. The plurality of strainers 156 and 158 may include a first strainer 156 disposed at one side of the expansion device 155 and a second strainer 158 disposed at the other side of the expansion device 155.

When the cooling operation is performed, the refrigerant condensed in the outdoor heat exchanger 120 may pass through the first strainer 156 and then pass through the second strainer 158 via the expansion device 155. On the other hand, when the heating operation is performed, the refrigerant condensed in the indoor unit 160 may pass through the second strainer 158 and then pass through the first strainer 156 via the expansion device 155.

[Service Valve and Installation Pipe]

The outdoor unit 20 further includes service valves 175 and 176 connected to the connection pipes 171 and 172 when being assembled with the indoor unit 160. The connection pipes 171 and 172 may be understood as pipes connecting the outdoor unit 20 to the indoor unit 160. The service valves 175 and 176 include a first service valve 175 disposed in one portion of the outdoor unit 20 and a second service valve 176 disposed in the other portion of the outdoor unit 20.

Also, the connection pipes 171 and 172 include a first connection pipe 171 extending from the first service valve 175 to the indoor unit 160 and a second connection pipe 172 extending from the second service valve 176 to the indoor unit 160. For example, the first connection pipe 171 may be connected to one side of the indoor unit 160, and the second connection pipe 172 may be connected to the other side of the indoor unit 160.

[Pressure Sensor]

The outdoor unit 20 further includes a pressure sensor 180. The pressure sensor 180 may be installed in the refrigerant pipe extending from the third port 113 of the flow control part 110 to the second service valve 176.

When the cooling operation is performed, the pressure sensor 180 may detect a pressure, i.e., a low pressure of the refrigerant evaporated in the indoor unit 160. On the other hand, the pressure sensor 180 may detect a pressure, i.e., a high pressure of the refrigerant compressed in the compressor 100.

[Gas/Liquid Separator]

The outdoor unit 20 further includes gas/liquid separators 150 and 151 disposed at a suction side of the compressor 100 to separate a gaseous refrigerant of the evaporated low-pressure refrigerant and thereby supply the separated refrigerant to the compressor 100. The gas/liquid separators 150 and 151 may include a first gas/liquid separator 150 connected to the fourth port 114 of the flow control part 110 and a second gas/liquid separator 151 provided at an outlet-side of the first gas/liquid separator 151. That is, the second gas/liquid separator 151 may be disposed between the first gas/liquid separator 150 and the compressor 100. For example, the first gas/liquid separator 150 may be called a "main gas/liquid separator", and the second gas/liquid separator 151 may be called an "auxiliary gas/liquid separator".

That is, the outdoor unit 20 may include a refrigerant pipe extending from the fourth port of the flow control part 110 to the compressor 110. The first and second gas/liquid separators 150 and 151 may be installed in the refrigerant pipe. The gaseous refrigerant separated by the gas/liquid separators 150 and 151 may be suctioned into the compressor 100.

<Configuration of Indoor Unit>

The indoor unit 160 includes an indoor heat exchanger (not shown) and an indoor fan disposed on one side of the indoor heat exchanger to blow indoor air. Also, the indoor unit 160 may further include an indoor expansion device decompressing the condensed refrigerant when the cooling operation is performed. Also, the refrigerant decompressed in the indoor expansion device may be evaporated in the indoor heat exchanger. The indoor unit 160 may be connected to the outdoor unit 20 through the first and second connection pipes 171 and 172.

[Refrigerant Pipe]

A plurality of constituents of the outdoor unit 20 may be connected to the indoor unit 160 through the refrigerant pipe 50, and the refrigerant pipe 50 may guide refrigerant circulation in the outdoor unit 20 and the indoor unit 160. The first and second connection pipes 171 and 172 may also be understood as one component of the refrigerant pipe 50.

A pipe diameter (an outer diameter) of the refrigerant pipe 50 may be determined based on air-conditioning capability of the air conditioner 10. For example, when the air-conditioning capability of the air conditioner 10 increases, the pipe diameter of the refrigerant pipe 50 may be designed to be relatively large.

[Refrigerant Flow During Cooling Operation]

When the air conditioner 10 performs the cooling operation, the refrigerant compressed in the compressor 100 is introduced into the first port 111 of the flow control valve 110 via the muffler 105 and then discharged through the second port 112. The refrigerant discharged from the flow control valve 110 is introduced into the outdoor heat exchanger 120 and then condensed to pass through the main expansion device 155 via the distributor 140 and the first strainer 150. Here, the decompression of the refrigerant does not occur.

Also, the decompressed refrigerant is discharged from the outdoor unit 20 after passing through the second strainer 158. Then, the refrigerant is introduced into the indoor unit 160 through the first connection pipe 171 and decompressed in the indoor expansion device and then evaporated in the indoor heat exchanger of the indoor unit 160. The evaporated refrigerant is introduced again into the outdoor unit 20 through the second connection pipe 172.

The refrigerant introduced into the outdoor unit 20 is introduced into the flow control valve 110 through the third port 113 and discharged from the flow control valve 110 through the fourth port 114. Also, the refrigerant discharged from the flow control valve 110 is phase-separated in the gas/liquid separator 150, and the separated gaseous refrigerant is suctioned into the compressor 100. This cycle may be repeatedly performed.

[Refrigerant Flow During Heating Operation]

When the air conditioner 10 performs the heating operation, the refrigerant compressed in the compressor 100 is introduced into the first port 111 of the flow control valve 110 via the muffler 105 and then discharged through the third port 113. The refrigerant discharged from the flow control valve 110 is introduced into the indoor unit 160 through the second connection pipe 172 and discharged from the indoor unit 160 after being condensed in the indoor heat exchanger. The refrigerant discharged from the indoor unit 160 is introduced into the outdoor unit 20 through the first connection pipe 171 and then is decompressed in the main expansion device 155 via the second strainer 158.

Also, the decompressed refrigerant is branched introduced into the outdoor heat exchanger 120 through the distributor 140 and the capillary 142 after passing through the first strainer 150. Then, the refrigerant is evaporated in the outdoor heat exchanger 120 and then is introduced into the flow control valve 110 through the second port 112.

Also, the refrigerant is discharged from the flow control valve 110 through the fourth port 114 and phase-separated in the gas/liquid separator 150, and the separated gaseous refrigerant is suctioned into the compressor 100. This cycle may be repeatedly performed.

[Refrigerant]

The refrigerant may circulate through the outdoor unit 20 and the indoor unit 160 to perform the cooling or heating operation of the air conditioner 10. For example, the refrigerant may include R21 or R134a as a single refrigerant.

The R32 is a methane-based halogenated carbon compound and expressed by Chemical Formula: $CH_2F_2$. The R32 is an eco-friendly refrigerant having ozone depletion potential (ODP) less than that of the R22 (Chemical Formula: $CHCLF_2$) according to the related art, and thus, a discharge pressure of the compressor is high.

The R134a is an ethane-based halogenated carbon compound and expressed by Chemical Formula: $CF_3CH_2F$. The R134a may be used for the air conditioner as a refrigerant replacing the R12 (Chemical Formula: $CCl_2F_2$) according to the related art.

For another example, the refrigerant may include R410a as a non-azeotropic mixed refrigerant.

The R410a is a material in which the R32 and R125 (Chemical Formula: $CHF_2CF_3$) are mixed at a weight ratio of 50:50. When the refrigerant is evaporated (saturated liquid=>saturated gas) in the evaporator, a temperature increases, and when the refrigerant is condensed (saturated gas=>saturated liquid) in the condenser, the temperature decreases. As a result, heat exchange efficiency may be improved. In this embodiment, the R134a is used as the refrigerant circulating through the air conditioner 10.

[Refrigerant Circulation Amount]

The refrigerant may be filled into the air conditioner 10 according to this embodiment. A filling amount of refrigerant may be determined based on a length of the refrigerant pipe 50 constituting the air conditioner 10. For example, about 3,300 g of the refrigerant may be filled based on a standard pipe having a length of about 7.5 m, and about 5,100 g of the refrigerant may be filled based on a long pipe having a length of about 50 m. In addition, about 40 g of the refrigerant may be filled into an additional pipe. Also, the capacity of the refrigerant compressed in the compressor 100 may be determined based on the air-conditioning capability of the air conditioner 10.

[Oil]

Oil for lubricating or cooling the compressor 100 is contained in the air conditioner according to this embodiment. The oil may include a PAG-based refrigerator oil, a PVE-based refrigerator oil, or a POE-based refrigerator oil.

The PAG-based refrigerator oil is a synthetic oil made of propylene oxide as a raw material and has a relatively high viscosity and thus has excellent viscosity characteristics depending on a temperature. Thus, when the PAG-based refrigerator oil is used, the compressor may be reduced in load.

The PVE-based refrigerating machine oil is a synthetic oil made of vinyl ether as a raw material and has good compatibility with the refrigerant, high volume resistivity, and excellent electrical stability. For example, the PVE-based refrigerating machine oil may be used for the compressor using the refrigerant such as the R32, the R124a, or the R410a.

The POE-based refrigerating machine oil is a synthetic oil obtained by dehydrating condensation of polyhydric alcohol and carboxylic acid and has good compatibility with the refrigerant and also has excellent oxidation stability and thermal stability in air. For example, the POE-based refrigerating machine oil may be used for the compressor using the refrigerant such as the R32 or the R410a. In this embodiment, the PVE-based refrigerating machine oil, e.g., FVC68D may be used as the refrigerating machine oil.

[New Material Pipe]: Ductile Stainless Steel Pipe

The refrigerant pipe 50 may include a new material pipe that is strong and having excellent processability. In detail, the new material pipe may be made of a stainless steel material and a material having at least copper (Cu)-containing impurities. The new material pipe has strength greater than that of a copper (Cu) pipe and machinability superior to that of the stainless steel pipe. For example, the new material pipe may be called a "ductile stainless steel pipe". The ductile stainless steel pipe refers to a pipe made of ductile stainless steel.

When the refrigerant pipe 50 is provided as the copper pipe, a kind of refrigerant circulating through the copper pipe may be limited. The refrigerant may be different in operation range according to the kind of refrigerant. If the high-pressure refrigerant having a high operation pressure range, that is, a high pressure that is capable of increasing is used for the copper pipe, the copper pipe may be broken, and thus the leakage of the refrigerant may occur. However, when the ductile stainless steel pipe is used as the new material pipe like this embodiment, the above-described limitation may be prevented from occurring.

[Property of Ductile Stainless Steel]

The ductile stainless steel has strength and hardness less than those of the stainless steel according to the related art, but has a good bending property. The ductile stainless steel pipe according to an embodiment of the present invention has strength and hardness less than those of the stainless steel according to the related art, but remains to at least the strength and hardness of the copper pipe. In addition, since the ductile stainless steel pipe has a bending property similar to that of the copper pipe, bending machinability may be very good. Here, the bending property and the bendability may be used in the same sense.

As a result, since the ductile stainless steel pipe has strength greater than that of the copper pipe, the possibility of the breakage of the pipe may be reduced. Thus, there is an effect that the number of types of refrigerant capable of being selected in the air conditioner increases.

[Suction Pipe of Compressor]

The refrigerant pipe 50 includes a suction pipe 210 guiding suction of the refrigerant into the compressor 100. The suction pipe 210 may be understood as a pipe extending from the fourth port 114 of the flow control valve 110 to the compressor 100. The suction pipe 210 may include the ductile stainless steel pipe.

As described above, the outer diameter (a pipe diameter) of the refrigerant pipe 50 may be determined based on air-conditioning capacity of the air conditioner 10. Thus, since the air conditioner 10 according to this embodiment has air-conditioning capacity ranging of about 16 kW to about 28 kW, the outer diameter of the suction pipe 210 may be determined based on the air-conditioning capacity of the air conditioner 10.

Since a low-pressure gas refrigerant flows through the suction pipe 210, the suction pipe 210 may have an outer diameter that is relatively larger than that of the discharge pipe.

In the air-conditioning capacity (ranging of about 16 kW to about 28 kW) of the air conditioner 10 according to this embodiment, the suction pipe 210 may have an outer diameter in at least one range of about 18.95 mm to about 19.15 mm, about 22.10 mm to about 23.30 mm, or about 25.30 mm to about 25.50 mm.

In an embodiment, the suction pipe 210 may have an outer diameter ranging from about 18.95 mm to about 19.15 mm. Here, the suction pipe 210 may have an outer diameter of about 19.05 mm (see the outer diameter of the standard pipe in Table 4 below).

In another embodiment, the suction pipe 210 may have an outer diameter ranging from about 22.10 mm to about 23.30 mm. Here, the suction pipe 210 may have an outer diameter of about 22.20 mm (see the outer diameter of the standard pipe in Table 4 below).

In further another embodiment, the suction pipe 210 may have an outer diameter ranging from about 25.30 mm to about 25.50 mm. Here, the suction pipe 210 may have an outer diameter of about 25.40 mm (see an outer diameter of a standard pipe in Table 4 below).

When at least two pipes are connected to each other, and then, one pipe is expanded, the suction pipe 210 may have an outer diameter corresponding to a diameter of the expanded pipe.

[Discharge Pipe of Compressor]

The refrigerant pipe 50 further includes a discharge pipe 200 through which the refrigerant compressed in the compressor 100 is discharged. The discharge pipe 220 may be understood as a pipe extending from a discharge portion of the compressor 100 to the first port 111 of the flow control valve 110. The discharge pipe 220 may include the ductile stainless steel pipe.

As described above, the outer diameter (a pipe diameter) of the refrigerant pipe 50 may be determined based on air-conditioning capacity of the air conditioner 10. Thus, since the air conditioner 10 according to this embodiment has air-conditioning capacity ranging of about 16 kW to about 28 kW, the outer diameter of the discharge pipe 220 may be determined based on the air-conditioning capacity of the air conditioner 10.

Since a high-pressure gas refrigerant flows through the discharge pipe 220, the discharge pipe 220 may have an outer diameter that is relatively less than that of the discharge pipe.

In the air-conditioning capacity (ranging of about 16 kW to about 28 kW) of the air conditioner 10 according to this embodiment, the discharge pipe 220 may have an outer diameter in at least one range of about 12.60 mm to about 12.80 mm, about 15.78 mm to about 15.98 mm, or about 18.95 mm to about 19.15 mm.

In an embodiment, the discharge pipe 220 may have an outer diameter ranging from about 12.60 mm to about 12.80 mm. Here, the discharge pipe 220 may have an outer diameter of about 12.70 mm (see the outer diameter of the standard pipe in Table 4 below).

In another embodiment, the discharge pipe 220 may have an outer diameter ranging from about 15.78 mm to about 15.98 mm. Here, the discharge pipe 220 may have an outer diameter of about 15.88 mm (see the outer diameter of the standard pipe in Table 4 below).

In further another embodiment, the discharge pipe 220 may have an outer diameter ranging from about 18.95 mm to about 19.15 mm. Here, the discharge pipe 220 may have an outer diameter of about 19.05 mm (see the outer diameter of the standard pipe in Table 4 below).

Likewise, when at least two pipes are connected to each other, and then one pipe is expanded, the discharge pipe 220 may have an outer diameter corresponding to an outer diameter of the expanded pipe.

Since the high-pressure gaseous refrigerant flows through the discharge pipe 220, and thus the discharge pipe 220 largely moves by vibration occurring in the compressor 100, it is necessary to maintain the strength of the discharge pipe 220 to preset strength or more. When the discharge pipe 220 is provided as the new material pipe, the discharge pipe 220 may be maintained at high strength to prevent the refrigerant from leaking by the damage of the discharge pipe 220.

A relatively low-pressure refrigerant flows through the suction pipe 210, but the pipe is disposed adjacent to the compressor 100, the movement due to the vibration of the compressor 100 may be largely large. Thus, since the strength of the suction pipe 210 is required to be maintained to the preset strength or more, the suction pipe 210 may be provided as the new material pipe.

Hereinafter, constituents defining the characteristics of the ductile stainless steel according to an embodiment of the present invention will be described. It is noted that the constitutional ratios of the constituents described below are weight percent (wt. %).

FIG. 3 is a microstructure photograph of a stainless steel having an austenite matrix structure of about 99% and a delta ferrite structure of about 1% or less, and FIG. 4 is a microstructure photograph of a stainless steel having only the austenite matrix structure.

1. Composition of Stainless Steel (1) Carbon (C): 0.3% or less

The stainless steel according to an embodiment of the present invention includes carbon (C) and chromium (Cr). Carbon and chromium react with each other to precipitate into chromium carbide. Here, the chromium is depleted around a grain boundary or the chromium carbide to cause corrosion. Thus, the carbon may be maintained at a small content.

Carbone is an element that is bonded to other elements to act to increase creep strength. Thus, in the content of carbon exceeds about 0.93%, the ductility may be deteriorated. Thus, the content of the carbon is set to about 0.03% or less.

(2) Silicon (Si): more than 0% and less than 1.7%

An austenite structure has yield strength less than that of a ferrite structure or martensite structure. Thus, a matrix structure of the stainless steel may be made of austenite so that the ductile stainless steel according to an embodiment of the present invention has a bending property (degree of freedom of bending) equal or similar to that of the copper.

However, silicon is an element forming ferrite, the more a content of silicon increases, the more a ratio of the ferrite in the matrix structure increases to improve stability of the ferrite. It is preferable that the silicon is maintained to be a small content, but it is impossible to completely block introduction of silicon into impurities during the manufacturing process.

When a content of silicon exceeds about 1.7%, the stainless steel has hardly ductility at a level of the copper material, and also, it is difficult to secure sufficient machinability. Thus, a content of silicon contained in the stainless steel according to an embodiment of the present invention is set to about 1.7% or less.

(3) Manganese (Mn): 1.5% to 3.5%

Manganese acts to inhibit phase transformation of the matrix structure of the stainless steel into a martensite-based material and expand and stabilize an austenite region. If a content of manganese is less than about 1.5%, the phase transformation effect of manganese does not sufficiently occur. Thus, to sufficiently obtain the phase transformation effect by manganese, a content of manganese is set to about 1.5% or less.

However, as the content of manganese increases, the yield strength of the stainless steel increases to deteriorate the ductility of the stainless steel. Thus, an upper limit of the content of manganese is set to about 3.5%.

(4) Chromium (Cr): 15% to 18%

Chromium is an element that improves corrosion initiation resistance of the stainless steel. The corrosion initiation refers to first occurrence of the corrosion in a state in which the corrosion does not exist in a base material, and the corrosion initiation resistance refers to a property of inhibiting the first occurrence of the corrosion in the base material. This may be interpreted to have the same means as corrosion resistance.

Since the stainless steel does not have the corrosion initiation resistance (corrosion resistance) when a content of chromium is less than about 15.0%, a lower limit of the content of chromium is set to about 15.0%.

On the other hand, if the content of chromium is too large, the ferrite structure is formed at room temperature to reduce the ductility. Particularly, the stability of the austenite is lost at a high temperature to reduce the strength. Thus, an upper limit of the content of the chromium is set to about 18.0% or less.

(5) Nickel (Ni): 7.0% to 9.0%

Nickel has a property of improving corrosion growth resistance of the stainless steel and stabilizing the austenite structure. Corrosion growth refers to growth of corrosion that already occurs in the base material while spreading over a wide range, and the corrosion growth resistance refers to a property of suppressing the growth of the corrosion.

Since the stainless steel does not have the corrosion growth resistance when a content of nickel is less than about 7.0%, a lower limit of the content of nickel is set to about 7.0%. Also, when the content of nickel is excessive, the stainless steel increases in strength and hardness, and thus it is difficult to secure sufficient machinability of the stainless steel. In addition, the cost increase, and thus it is not desirable economically. Thus, an upper limit of the content of the nickel is set to about 9.0% or less.

(6) Copper (Cu): 1.0% to 4.0%

Copper acts to inhibit phase transformation of the matrix structure of the stainless steel into a martensite structure and improve the ductility of the stainless steel. If a content of copper is less than about 1.0%, the phase transformation suppressing effect by copper does not sufficiently occur. Thus, to sufficiently obtain the phase transformation suppressing effect by copper, a lower limit of a content of copper is set to about 1.0% or less. Particularly, a content of copper has to set to about 1.0% or more so that the stainless steel has a bending property equal or similar to that of the copper.

Although the more the content of copper increases, the more the phase transformation suppressing effect of the matrix structure increases, the increase gradually decreases. Also, if the content of copper is excessive to exceed about 4% to about 4.5%, since the effect is saturated, and the occurrence of martensite is promoted, it is not preferable. Also, since copper is an expensive element, it affects economic efficiency. Thus, an upper limit of the content of copper is set to about 4.0% so that the effect of suppressing the phase transformation of copper is maintained to the saturation level, and the economical efficiency is secured.

(7) Molybdenum (Mo): 0.03% or less (8) Phosphorus (P): 0.04% or less (9) Sulfur (S): 0.04% or less

(10) Nitrogen (N): 0.03% or less

Since molybdenum, phosphorus, sulfur, and nitrogen are elements originally contained in the steel-finished product and cure the stainless steel, it is desirable to maintain the contents as low as possible.

2. Matrix Structure of Stainless Steel

When the stainless steel is classified in view of a metal structure (or matrix structure), the stainless steel is classified into austenite type stainless steel containing chromium (18%) and nickel (8%) as main components and ferrite type stainless steel containing chromium (18%) as a main component, and martensite type stainless steel containing chromium (8%) as a main component.

Also, since the austenite type stainless steel is excellent in corrosion resistance against salt and acid and has high ductility, the ductile stainless steel according to an embodiment of the present invention is preferably the austenite type stainless steel.

Also, the austenite structure has yield strength and hardness less than those of the ferrite structure or the martensite structure. Furthermore, when a crystal size is grown under the same condition, an average grain size of the austenite is the largest and thus is advantageous for improving the ductility.

To improve the ductility of the stainless steel, the matrix structure of the stainless steel may be formed as only the austenite structure. However, since it is very difficult to control the matrix structure of the stainless steel with only the austenite, it is inevitable to include other structures.

In detail, the other matrix structure that affects the ductility of the austenite type stainless steels is delta ferrite (δ-ferrite) which occurs during the heat treatment process. That is, the more a content of the delta ferrite, the more the hardness of the stainless steel increases, but the ductility of the stainless steel decreases.

The stainless steel may have an austenite matrix structure of about 90% or more, preferably about 99% or more and a delta ferrite matrix structure of about 1% or more on the base of a grain size area. Thus, one of methods for improving the ductility of the stainless steels is to reduce an amount of delta ferrite contained in the austenite type stainless steel.

Even when the ductile stainless steel according to an embodiment of the present invention has a delta ferrite matrix structure of about 1% or less, the fact that the delta ferrite is locally distributed in a specific crystal grain rather than being uniformly distributed throughout the crystal grain is advantageous in improvement of the ductility.

[Microstructure of Ductile Stainless Steel]

FIG. 3 is a microstructure photograph of a stainless steel having an austenite matrix structure of about 99% and a delta ferrite structure of about 1% or less, and FIG. 4 is a microstructure photograph of a stainless steel having only the austenite matrix structure. The stainless steel having the structure of FIG. 3 is a microstructure of the ductile stainless steel according to an embodiment of the present invention.

The stainless steel of FIG. 3 and the stainless steel of FIG. 4 have average grain sizes corresponding to grain size Nos. 5.0 to 7.0. The average gain size will be descried below.

Table 1 below is a graph of results obtained by comparing mechanical properties of the stainless steel (a material 1) of FIG. 3 and the stainless steel (a material 2) of FIG. 3.

TABLE 1

| | Kind | Mechanical Property | | | |
| --- | --- | --- | --- | --- | --- |
| | | Yield Strength [MPa] | Tensile Strength [Mpa] | Hardness [Hv] | Elongation [%] |
| Material 1 | Stainless Steel (austenite + Delta Ferrite) | 180 | 500 | 120 | 52 |
| Material 2 | Stainless Steel (austenite) | 160 | 480 | 110 | 60 |

Referring to Table 1 above, it is seen that the material 2 has a physical property less than that of the material 1 in strength and hardness. Also, it is seen that the material 2 has an elongation greater than that of the material 1. Therefore, to lower the strength and the hardness of the stainless steel, it is ideal that the stainless steel has only the austenite matrix structure. However, since it is difficult to completely remove the delta ferrite matrix structure, it is desirable to minimize a ratio of the delta ferrite matrix structure.

Also, as described above, when the delta ferrite structures are densely distributed in a specific grain rather than uniformly distributed, the effect is more effective for the ductility the stainless steel.

In FIG. 3, a large grain 101 represents an austenite matrix structure, and a small grain 102 in the form of a black spot represents a delta ferrite matrix structure.

3. Average Grain Diameter of Stainless Steel

An average grain diameter of the stainless steel may be determined according to composition and/or thermal treatment conditions. The average grain diameter of the stainless steel affects the strength and the hardness of the stainless steel. For example, the more the average grain diameter decreases, the more the stainless steel increase in strength and hardness, and the more the average grain diameter increases, the more the stainless steel decrease in strength and hardness.

The ductile stainless steel according to an embodiment of the present invention has characteristics of low strength and hardness when compared to the stainless steel according to the related art in addition to good bending property by controlling the content of copper and the grain size area of delta ferrite, and also, the ductile stainless steel has strength and hardness greater than those of copper.

For this, the average grain diameter of the stainless steel is limited to about 30 μm to about 60 μm. An average grain diameter of a general austenite structure is less than about 30 μm. Thus, the average grain diameter has to increase to about 30 μm through the manufacturing process and the thermal treatment.

According to the criteria of American Society for Testing and Materials (ASTM), the average grain diameter of about 30 μm to about 60 μm corresponds to grain size Nos. 5.0 to 7.0. On the other hand, an average grain diameter less than about 30 μm corresponds to ASTM grain size No. 7.5 or more.

If the average grain diameter of the stainless steel is less than about 30 μm, or the grain size number is greater than 7.0, it does not have the characteristics of low strength and low hardness required in this embodiment of the present invention. Particularly, the average grain diameter (or the grain size number) of the stainless steel is a key factor in determining the low strength and low hardness characteristics of the stainless steel.

Referring to Table 2 below, since the copper pipe according to the related art has physical properties of the low strength and the low hardness, the copper pipe is commercialized as the refrigerant pipe constituting the refrigerant circulation cycle, but there is a limitation of reliability due to the corrosion and pressure resistance against a new refrigerant.

Also, since the stainless steels of Comparative Examples 2 to 5 have excessively large strength and hardness in comparison to the copper pipes, there is a limitation that the machinability is poor even if the limitation of the corrosion and the pressure resistance of copper are solved.

On the other hand, the stainless steel according to an embodiment of the present invention has strength and hardness greater than those the copper pipes according to the related art and has strength and hardness less than those of the stainless steels of Comparative Examples 2 to 5. Therefore, since the corrosion resistance and the pressure resistance of the copper pipe are solved, it is suitable to be used as a high-pressure new refrigerant pipe such as R32.

In addition, since it has an elongation greater than that of the copper pipe, the limitation of machinability of the stainless steel according to the related art may also be solved.

TABLE 2

| | | Mechanical Property | | | |
|---|---|---|---|---|---|
| | Kind | Yield Strength [MPa] | Tensile Strength [MPa] | Hardness [Hv] | Elongation [%] |
| Comparative Example 1 | Copper Pipe (C1220T) | 100 | 270 | 100 | 45 or more |
| Comparative Example 2-5 | Stainless Steel (Grain size No. 7.5 or more) | about 200 | about 500 | about 130 | 50 or more |
| The present invention | Stainless Steel (Grain size No. 5.0~7.0) | about 160 | about 480 | 120 or less | 60 or more |

In summary, the ductile stainless steel defined in an embodiment of the present invention may represent stainless steel which has about 99% of austenite and about 1% or less of delta ferrite and in which the above-described components are contained at a preset ratio.

FIG. 5 is a view illustrating an outer diameter and an inner diameter of the refrigerant pipe according to the first embodiment of the present invention.

Referring to FIGS. 2 and 5, when the compressor 100 according to the first embodiment of the present invention is driven, the refrigerant suctioned into the compressor 100 involves a temperature change after the compression. Due to the change in temperature, a change in stress at the suction pipe 210 and the discharge pipe 220 may be more severe than other pipes.

As illustrated in FIG. 4, this embodiment is characterized in that the suction pipe 210 and the discharge pipe 220, which exhibit the most severe pressure and vibration when the refrigerant changes in phase, are formed as the ductile stainless steel pipe subjected to a ductileness process to increase allowable stress. However, the present invention is not limited to only the suction pipe and the discharge pipe, and any one or more pipes connecting the outdoor unit to the indoor unit may be provided as the ductile stainless steel pipe according to the variation of the stress.

The air-conditioning capability of the air conditioner 10 according to this embodiment may be selected in the range of about 2.5 kW to about 15 kW. An outer diameter of the ductile stainless steel pipe may be determined based on the selected air-conditioning capability of the air conditioner 10.

Also, the refrigerant used in the air conditioner 10 according to the present invention may include the R32, the R134a, or the R401a as described above. Particularly, a thickness of the ductile stainless steel pipe may be differently determined according to kinds of refrigerants.

[Method for Setting Thickness of Ductile Stainless Steel]

A thickness of the ductile stainless steel pipe may be determined according to the following Mathematical Equation. The Mathematical Equation below is calculated based on ASME B31.1, which provides codes for standards and guidelines for a pipe, and KGS Code, which categorizes technical items such as facilities, technologies, and inspections specified by gas related laws and regulations.

$$t_m = \frac{P \times D_0}{2S + 0.8P} + T_{extra} \quad \text{[Equation 1]}$$

Here, $t_m$ represents a minimum thickness of the stainless steel pipe, P represents a design pressure (MPa), $D_0$ represents an outer diameter (mm) of the stainless steel pipe, S represents allowable stress (M/mm²), and $T_{extra}$ represents a clearance thickness according to corrosion, thread machining, and the like. The $T_{extra}$ is determined to be about 0.2 when a material of the pipe is made of copper, aluminum, or stainless steel.

[Definition of Pipe Diameter]

As illustrated in FIG. 5, an outer diameter of the ductile stainless steel pipe used for the suction pipe 210 or the discharge pipe 220 may be defined as a, and an inner diameter may be defined as b. Referring to Mathematical Equation 1, it is seen that the minimum thickness of the pipe is proportional to the outer diameter of the pipe and inversely proportional to the allowable stress.

[Allowable Stress (S)]

The allowable stress represents a value obtained by dividing reference strength by a safety factor, i.e., a maximum value of stress (deformation force) that is allowed to exert weight, which is considered to be tolerable without deformation or breakage of the pipe when external force is applied to the pipe.

In this embodiment, the allowable stress standard of the ductile stainless steel pipe is derived to satisfy the code written in ASME SEC. VIII Div. 1, and the allowable stress S may be set to a relatively small value of a value obtained by dividing the tensile strength of the pipe by 3.5 or a value obtained by dividing the yield strength of the pipe by 1.5. The allowable stress may be a value that varies depending on the material of the pipe and be determined to about 93.3 Mpa on the basis of the SME SEC. VIII Div. 1.

When the same stress is applied to the pipe, the stainless steel may have a stress margin greater than that of copper, and thus a degree of design freedom of the pipe may increase. As a result, to reduce the stress transmitted to the pipe, it is possible to escape the restriction that the pipe has to have a long length. For example, to reduce vibration transmitted from the compressor 100, it is unnecessary to bend the pipe several times in the form of a loop within a limited installation space.

[Outer Diameter of Ductile Stainless Steel Pipe]

Air-conditioning capability of the air conditioner 10, i.e., cooling capability or heating capability may be determined based on compressibility of the compressor 100. Also, an outer diameter of the ductile stainless steel pipe may be determined according to the cooling capability of the compressor. That is, the capacity of the compressor may be a criterion for determining the outer diameter of the ductile stainless steel pipe.

For example, in the air conditioner 10 having air-conditioning capacity of about 16 kW to about 28 kW, when the suction pipe 210 and the discharge pipe 220 are provided as the ductile stainless steel pipes, a standardized outer diameter of the suction pipe may be about 19.05 mm, about 22.20 mm, or about 25.40 mm, and a standardized outer diameter of the discharge pipe 220 may be about 12.70 mm, about 15.88 mm, or about 19.05 mm.

[Design Pressure P According to Kind of Refrigerant]

A design pressure may be a pressure of the refrigerant and correspond to a condensation pressure of the refrigerant cycle. For example, the condensation pressure may be determined based on a temperature value (hereinafter, referred to as a condensation temperature) of the refrigerant condensed in the outdoor heat exchanger 120 or the indoor heat exchanger. Also, the design pressure may represent a saturated vapor pressure of the refrigerant at the condensation temperature. In general, the air conditioner may have a condensation temperature of about 65° C.

The saturated vapor pressure according to kinds of refrigerants is shown in Table 3.

TABLE 3

| Refrigerant Temperature (° C.) | R134a (Mpa) | R410a (Mpa) | R32 (Mpa) |
| --- | --- | --- | --- |
| −20 | 0.03 | 0.30 | 0.30 |
| 0 | 0.19 | 0.70 | 0.71 |
| 20 | 1.47 | 1.35 | 1.37 |
| 40 | 0.91 | 2.32 | 1.47 |
| 60 | 1.58 | 3.73 | 3.85 |
| 65 | 1.79 | 4.15 | 4.30 |

Referring to Table 3 above, when the R410A is used as the refrigerant, a saturated vapor pressure at about 65° C. is 4.15, and thus the design pressure P may be determined to about 4.15 (MPa).

[Method for Calculating Minimum Thickness of Ductile Stainless Steel]

As described above, the allowable stress S is given by ASME SEC. VIII Div. 1, and the design pressure P is determined to about 4.15 MPa when the refrigerant is R134a and the refrigerant temperature is about 65° C. A minimum thickness of the pipe, which is calculated according to the outer diameter of the pipe by applying the determined allowable stress S and the design pressure P to Mathematical Equation 1 may be confirmed by the following Table 4.

TABLE 4

| | Minimum Thickness (mm) | | | |
| --- | --- | --- | --- | --- |
| | Embodiment to which | | Calculated Minimum Thickness (R134a) | |
| Outer diameter of standard pipe | margin is applied (ductile stainless steel pipe) R134a | Comparative Example (copper pipe) | ASME B31.1 ($t_m$) | JIS B 8607 ($t_m$-$t_{extra}$) |
| φ4.00 | 0.40 | | 0.25 | 0.05 |
| φ4.76 | 0.40 | | 0.26 | 0.06 |
| φ5.00 | 0.40 | | 0.27 | 0.07 |
| φ6.35 | 0.40 | 0.622 | 0.30 | 0.10 |
| φ7.00 | 0.40 | | 0.32 | 0.12 |
| φ7.94 | 0.40 | 0.622 | 0.34 | 0.14 |

TABLE 4-continued

Minimum Thickness (mm)

| Outer diameter of standard pipe | Embodiment to which margin is applied (ductile stainless steel pipe) R134a | Comparative Example (copper pipe) | Calculated Minimum Thickness (R134a) | |
|---|---|---|---|---|
| | | | ASME B31.1 ($t_m$) | JIS B 8607 ($t_m$-$t_{exrta}$) |
| φ9.52 | 0.40 | 0.622 | 0.36 | 0.16 |
| φ12.70 | 0.50 | 0.622 | 0.40 | 0.20 |
| φ15.88 | 0.50 | 0.800 | 0.45 | 0.25 |
| φ19.05 | 0.50 | 0.800 | 0.49 | 0.29 |
| φ22.20 | 0.60 | 1.041 | 0.53 | 0.33 |
| φ25.40 | 0.60 | 1.168 | 0.56 | 0.36 |
| φ28.00 | 0.70 | 1.168 | 0.60 | 0.40 |
| φ31.80 | 0.70 | 1.283 | 0.64 | 0.44 |
| φ34.90 | 0.70 | 1.283 | 0.68 | 0.48 |
| φ38.10 | 0.80 | 1.410 | 0.72 | 0.52 |
| φ41.28 | 1.00 | 1.410 | 0.76 | 0.56 |
| φ50.80 | 1.00 | | 0.86 | 0.66 |
| φ54.00 | 1.00 | 1.623 | 0.90 | 0.70 |

Referring to Table 4, a minimum thickness of the ductile stainless steel pipe derived based on ASME B31.1 and a minimum thickness of the ductile stainless steel pipe derived based on JIS B 8607 may be confirmed. Here, in an embodiment, the ductile stainless steel pipe was used, and in Comparative example, the existing copper pipe was used.

JIS B 8607 is a reference code for a pipe used in Japan. In case of JIS B 8607, a minimum thickness is derived to be less than that in case of ASME B31.1 because the textra value that is the clearance thickness due to corrosion and the thread machining is not considered, unlike ASME B31.1. The textra value may be set to about 0.2 mm in case of copper, a copper alloy, aluminum, an aluminum alloy, and stainless steel.

Although the minimum thickness of the ductile stainless steel pipe according to an embodiment is derived based on ASME B31.1, the minimum thickness may be applicable with a predetermined margin determined between about 0.1 mm to about 0.2 mm in consideration of the pressure when the R134a as the refrigerant. That is, an embodiment is understood that the minimum thickness is suggested with a margin as one example. If the minimum thickness is greater than the calculated minimum thickness, the margin may vary based on the safety factor.

Particularly, in case of the same outer diameter (φ7.94) in Table 4, it is confirmed that the applicable pipe thickness according to an embodiment is about 0.50 mm, and the applicable pipe thickness according to Comparative Example is about 0.622 mm. That is, when a pipe designed to have the same outer diameter is provided as the ductile stainless steel pipe described in the embodiment, it means that the thickness of the pipe may be further reduced, and also this means that an inner diameter of the pipe may further increase.

In the air-conditioning capacity (ranging of about 16 kW to about 28 kW) of the air conditioner 10 according to this embodiment, the suction pipe 210 may have an outer diameter in at least one range of about 18.95 mm to about 19.15 mm, about 22.10 mm to about 23.30 mm, or about 25.30 mm to about 25.50 mm.

For example, when the suction pipe 210 has an outer diameter ranging of about 18.95 mm to about 19.15 mm, referring to Table 4, the standard pipe of the suction pipe 210 may have an outer diameter of about 19.05 mm, and the suction pipe 210 may have a minimum thickness of about 0.49 mm in the case of ASME B31.1, about 0.29 mm in the case of JIS B 8607, and about 0.50 mm in the case of an embodiment to which a margin is applied. Thus, a limit thickness value, which is applicable to the suction pipe 210, among the above criteria is about 0.29 mm on the basis of JIS B 8607. As a result, the suction pipe 210 may have an inner diameter of about 18.47 mm (=19.05−2*0.29) or less.

For another example, when the suction pipe 210 has an outer diameter ranging of about 22.10 mm to about 22.30 mm, referring to Table 4, the standard pipe of the suction pipe 210 may have an outer diameter of about 22.20 mm, and the suction pipe 210 may have a minimum thickness of about 0.53 mm in the case of ASME B31.1, about 0.33 mm in the case of JIS B 8607, and about 0.60 mm in the case of an embodiment to which a margin is applied. Thus, a limit thickness value, which is applicable to the suction pipe 210, of the above criteria is about 0.33 mm on the basis of JIS B 8607. As a result, the suction pipe 210 may have an inner diameter of about 21.54 mm (=22.20−2*0.33) or less.

For further another example, when the suction pipe 210 has an outer diameter ranging of about 25.30 mm to about 25.50 mm, referring to Table 4, the standard pipe of the suction pipe 210 may have an outer diameter of about 25.40 mm, and the suction pipe 210 may have a minimum thickness of about 0.56 mm in the case of ASME B31.1, about 0.36 mm in the case of JIS B 8607, and about 1.00 mm in the case of an embodiment to which a margin is applied. Thus, a limit thickness value, which is applicable to the suction pipe 210, of the above criteria is about 0.36 mm on the basis of JIS B 8607. As a result, the suction pipe 210 may have an inner diameter of about 24.68 mm (=25.40−2*0.36) or less.

In the air-conditioning capacity (ranging of about 16 kW to about 28 kW) of the air conditioner 10 according to this embodiment, the discharge pipe 220 may have an outer diameter in at least one range of about 12.60 mm to about 12.80 mm, about 15.78 mm to about 15.98 mm, or about 18.95 mm to about 19.15 mm.

First, when the discharge pipe 220 has an outer diameter ranging of about 12.60 mm to about 12.80 mm, referring to Table 4, the standard pipe of the discharge pipe 220 may have an outer diameter of about 12.70 mm, and the discharge pipe 220 may have a minimum thickness of about 0.40 mm in the case of ASME B31.1, about 0.20 mm in the case of JIS B 8607, and about 0.50 mm in the case of an embodiment to which a margin is applied. Thus, a limit thickness value, which is applicable to the discharge pipe 210, of the above criteria is about 0.20 mm on the basis of JIS B 8607. As a result, the discharge pipe 220 may have an inner diameter of about 12.30 mm (=12.70–2*0.20) or less.

For another example, when the discharge pipe 220 has an outer diameter ranging of about 15.78 mm to about 15.98 mm, referring to Table 4, the standard pipe of the discharge pipe 220 may have an outer diameter of about 15.88 mm, and the discharge pipe 220 may have a minimum thickness of about 0.45 mm in the case of ASME B31.1, about 0.25 mm in the case of JIS B 8607, and about 0.50 mm in the case of an embodiment to which a margin is applied. Thus, a limit thickness value, which is applicable to the discharge pipe 220, of the above criteria is about 0.25 mm on the basis of JIS B 8607. As a result, the discharge pipe 220 may have an inner diameter of about 15.38 mm (=15.88–2*0.25) or less.

For further another example, when the discharge pipe 220 has an outer diameter ranging of about 18.95 mm to about 19.15 mm, referring to Table 4, the standard pipe of the discharge pipe 220 may have an outer diameter of about 19.05 mm, and the discharge pipe 220 may have a minimum thickness of about 0.49 mm in the case of ASME B31.1, about 0.29 mm in the case of JIS B 8607, and about 0.50 mm in the case of an embodiment to which a margin is applied. Thus, a limit thickness value, which is applicable to the discharge pipe 220, of the above criteria is about 0.29 mm on the basis of JIS B 8607. As a result, the discharge pipe 220 may have an inner diameter of about 18.47 mm (=19.05–2*0.29) or less.

In summary, the outer diameter of the pipe used in the compressor 100 according to this embodiment may be determined by the refrigeration capacity of the compressor or the air-conditioning capacity of the air conditioner 10, and the design pressure may be determined according to the used refrigerant.

In case where the suction pipe and the discharge pipe are provided as the ductile stainless steel pipes described in the embodiment, since the allowable stress of the stainless steel is greater than that of copper, it is seen that the thickness of the pipe is reduced by applying the relatively large allowable stress to Mathematical Equation 1. That is, the ductile stainless steel pipe having relatively high strength or hardness may be used to increase the allowable stress, and thus, a thickness at the same outer pipe diameter may be reduced.

Thus, even though the ductile stainless steel pipe according to this embodiment is designed to have the same outer diameter as that of the copper pipe according to the related art, the inner diameter may be designed to be larger to reduce flow resistance of the refrigerant, thereby improving the circulation efficiency of the refrigerant.

FIG. 6 is a flowchart illustrating a method for manufacturing the ductile stainless steel pipe according to the first embodiment of the present invention, FIG. 7 is a schematic view of a cold rolling process S1 of FIG. 6, FIG. 8 is a schematic view of a slitting process S2 of FIG. 6, FIG. 9 is a schematic view of a foaming process S3 of FIG. 6, FIGS. 10 to 13 are cross-sectional views illustrating a process of manufacturing a ductile stainless steel pipe according to the manufacturing method of FIG. 6, and FIG. 14 is a schematic view of a bright annealing process of FIG. 6.

As described above, since the stainless steel according to the related art has strength and hardness greater than those of copper and thus has a limitation of machinability. Particularly, there is a limitation that the stainless steel is limited in bending.

[Required Property of Ductile Stainless Steel Pipe]

To solve these limitations, since the ductile stainless steel pipe according to the present invention has a composition containing copper, a matrix structure made of austenite, and an average grain size of about 30 μm to about 60 μm, the ductile stainless steel pipe may have strength and hardness less than those of the stainless steel pipe according to the related art.

Particularly, the austenite has low resistive abdominal strength and low hardness characteristics when compared to ferrite or martensite. Thus, to manufacture the ductile stainless steel pipe having the characteristics of the low strength and the low hardness required in this embodiment of the present invention, it is required to have an austenite matrix structure of about 99% or more and a delta ferrite matrix structure of about 1% or less on the base of a grain size area of the ductile stainless steel pipe.

For this, the ductile stainless steel pipe may have austenite matrix structure of about 99% or more and the delta ferrite matrix structure of about 1% or less on the base of the grain size area of the ductile stainless steel pipe by applying the composition ratio and performing an additional thermal treatment.

[Thermal Treatment Process of Ductile Stainless Steel]

A thermal treatment process of the ductile stainless steel pipe will be described in detail.

Unlike that the pipe made of copper is manufactured by a single process such as drawing, it is difficult to manufacture the pipe made of the ductile stainless steel through a single process because of having strength and hardness greater than those of copper.

The thermal treatment process of the ductile stainless steel pipe according to this embodiment may include a cold rolling process S1, a slitting process S2, a forming process S3, a welding process S4, a cutting process S5, a drawing process S6, and a bright annealing process S7.

[First Process: Cold Rolling Process (S1)]

The cold rolling process S1 may be understood as a process for rolling the ductile stainless steel provided in the casting process by passing through two rotating rolls at a temperature below a recrystallization temperature. That is, in the cold-rolled ductile stainless steel, unevenness or wrinkles on a surface of a thin film may be improved, and surface gloss may be given on the surface.

As illustrated in FIG. 7, the ductile stainless steel is provided in the form of a sheet 310, and the sheet 310 is provided to be wound in a coil shape by an uncoiler.

The sheet 310 may receive continuous force by passing between the two rotating rolling rolls 320 disposed in a vertical direction, and thus the sheet 310 may be widened in surface area and thinned in thickness. In this embodiment, the ductile stainless steel is provided in the form of a sheet having a thickness of about 1.6 mm to about 3 mm in the casting process, and the sheet may be cold-machined to a sheet having a thickness of about 1 mm or less through the cold rolling process S1.

[Second Process: Slitting Process (S2)]

The slitting process S2 may be understood as a process of cutting the cold-machined sheet 310 into a plurality of sections having a desired width by using a slitter. That is, the single sheet 310 may be cut and machined into a plurality of pieces through the slitting process S2.

As illustrated in FIG. 8, the cold-machined sheet 310 may pass through the slitter 332 while the wound coil is unwound by the rotation of the uncoiler 331 in the state in which the sheet 310 is wound in a coil shape around an outer circumferential surface of the uncoiler 331.

For example, the slitter 332 may include a shaft that is disposed in the vertical direction of the sheet 310 and a rotational cutter 332a coupled to the shaft. The rotational cutter 332a may be provided in plurality, and the plurality f rotational cutters 332 may be spaced apart from each other in a width direction of the sheet 310. Spaced distances between the plurality of rotational cutters 332a may be the same or different from each other in some cases.

Thus, when the sheet 310 passes through the slitter 332, the single sheet 310 may be divided into a plurality of sheets 310a, 310b, 310c, and 310d by the plurality of rotational cutters 332a. In this process, the sheet 310 may have a suitable diameter or width of the refrigerant pipe to be applied. Here, the sheet 310 may be pressed by a plurality of support rollers 333 and 334 arranged in the vertical direction so as to be precisely cut by the slitter 332.

When the slitting process S2 is completed, a bur may be formed on an outer surface of the sheet 310, and the bur needs to be removed. If the bur remains on the outer surface of the sheet 310, welding failure may occur in a process of welding the pipe machined in the form of the sheet 310 to the other pipe, and the refrigerant may leak through a poor welding portion. Accordingly, when the slitting step S2 is completed, a polishing process for removing the bur needs to be additionally performed.

[Third Process: Foaming Process (S3)]

The forming process S3 may be understood as a process of molding the ductile stainless steel in the form of a sheet 310a by passing through a plurality of molding rolls 340 to manufacture the ductile stainless steel in the form of a pipe 310a.

As illustrated in FIG. 9, in the state that the sheet 310a is wound in the form of the coil on the outer circumferential surface of the uncoiler, the coil wound by the rotation of the uncoiler is unwound to enter into the multi-staged forming rolls 340 that alternately disposed in the vertical or horizontal direction. The sheet 310a entering into the multi-staged molding rolls 340 may successively pass through the molding rolls 340 and thus be molded in the form of a pipe 310e of which both ends are adjacent to each other.

FIG. 10 illustrates a shape in which the ductile stainless steel having the sheet shape is wound and then molded in the form of a pipe 10e. That is, the ductile stainless steel having the form of the sheet 10a may be molded into a pipe 310e, of which both ends 311a and 311b approach each other, through the forming process S3.

[Fourth Process: Welding Process (S4)]

The welding process S4 may be understood as a process of bonding both the ends 311a and 311b of the pipe 310e, which approach each other by being wound by the forming process S3, to manufacture a welded pipe. In the welding process S4, the welded pipe may be realized by butt-welding both ends facing each other through a melting welding machine, for example, a general electric resistance welding machine, an argon welding machine, or a high-frequency welding machine.

FIG. 11 illustrates a pipe manufactured by rolling and welding a sheet made of ductile stainless steel. Particularly, both the ends 311a and 311b of the pipe 310e may be welded in a longitudinal direction of the pipe 310e to bond both the ends 311a and 311b to each other.

Here, in the welding process, a weld zone 313 is formed in the longitudinal direction of the pipe 310e. As illustrated in FIG. 11, since beads 313a and 313b that slightly protrude from an inner circumferential surface 311 and an outer circumferential surface 312 of the pipe 310e are formed at the weld zone 313, each of the inner circumferential surface 311 and the outer circumferential surface 312 of the pipe 310e does not have a smooth surface.

Heat-affected zones 314a and 314b may be further formed on both sides of the welded zone 313 by heat during the welding process. The heat-affected zones 314a and 314b may also be formed in the longitudinal direction of the pipe 310e, like the welded zone 313.

[Fifth Process: Cutting Process (S5)]

The cutting process S5 may be understood as a process of partially cutting the bead 313a of the welded zone 313 so that the outer circumferential surface 311 of the pipe 310e has the smooth surface. The cutting process S5 may be continuous with the welding process S4.

For example, the cutting process S5 may include a process of partially cutting the bead 313a using a bite while moving the pipe in the longitudinal direction through press bead rolling.

FIG. 12 illustrates a ductile stainless steel pipe in which the cutting process S5 is finished. That is, the bead 313a formed on the outer circumferential surface 311 of the pipe 310e may be removed through the cutting process S5. In some cases, the cutting process S5 may be performed together with the welding process S4, whereas the cutting process S5 may be omitted.

[Sixth Process: Drawing Process (S6)]

The drawing process S6 may be understood as a process of applying external force to the bead 313b of the welded zone 313 so that the outer circumferential surface 312 of the pipe 310e has the smooth surface.

For example, the drawing process S6 may be performed by using a drawer including dies having a hole with an inner diameter less than an outer diameter of the pipe 310e manufactured through the forming process S3 and the welding process S4 and a plug having an outer diameter with an outer diameter less than an inner diameter of the pipe 310e manufactured through the forming process S3 and the welding process S4.

Particularly, the pipe 310e in which the welding process S4 and/or the cutting process S5 are performed may pass through the hole formed in the dies and the plug. Here, since the bead 313a formed on the outer circumferential surface 311 of the pipe 310e protrudes outward from a center of the outer circumferential surface 311 of the pipe 310e, the bead 313a may not pass through the hole of the dies and thus be removed while being plastic-deformed.

Similarly, since the bead 313b formed on the inner circumferential surface 312 of the pipe 310e protrudes toward the center of the inner circumferential surface 312 of the pipe 310e, the bead 313b may not pass through the plug and thus be removed while being plastic-deformed.

That is, as described above, the welding beads 313a and 313b formed on the inner circumferential surface 312 and the outer circumferential surface 311 of the pipe 310e may be removed through the drawing process S6. Also, since the welded bead 313a on the inner circumferential surface 312 of the pipe 310e is removed, it is possible to prevent a protrusion from being formed on the inner circumferential surface 312 of the pipe 310e when the pipe 310e is expanded for the refrigerant pipe.

FIG. 13 illustrates a ductile stainless steel pipe in which the drawing process S6 is finished. That is, the beads 313a and 313b formed on the inner and outer circumferential surfaces 311 and 312 of the pipe 310e may be removed through the drawing process S6.

The reason for forming the outer and inner circumferential surfaces 311 and 312, which have the smooth surfaces, of the pipe 310e is for forming the uniform inner diameter of the pipe 310e and easily connecting the pipe to the other pipe. Also, the reason for forming the uniform inner diameter in the pipe 310e is for maintaining a smooth flow of the refrigerant and a constant pressure of the refrigerant. Although not shown, after the drawing process S6, a groove (not shown) may be formed on the outer and inner circumferential surfaces 311 and 312 of the pipe 310e through mechanical machining.

[Seventh Process: Bright Annealing Process (S7)]

The bright annealing process S7 may be understood as a process for heating the pipe 310e from which the welded beads are removed to remove heat history and residual stress remaining in the pipe 310e. In this embodiment, the austenite matrix structure of about 99% or more and the delta ferrite matrix structure of about 1% or less are formed based on the grain size area of the ductile stainless steel, and also, to increase the average grain size of the ductile stainless steel to about 30 μm to about 60 μm, the thermal treatment process is performed.

Particularly, the average grain diameter (or the grain size number) of the ductile stainless steel is a key factor in determining the low strength and low hardness characteristics of the stainless steel. Particularly, the bright annealing process S7 is performed by annealing the pipe 310e, from which the welded beads are removed, in a stream of a reducing or non-oxidizing gas and cooling the annealed pipe 310e as it is after the annealing.

As illustrated in FIG. 14, the pipe 310e from which the welded beads are removed passes through an annealing furnace 350 at a constant speed. The inside of the annealing furnace 350 may be filled with an atmospheric gas, and also, the inside of the annealing furnace 350 may be heated at a high temperature by using an electric heater or a gas burner.

That is, the pipe 310 may receive a predetermined heat input while passing through the annealing furnace 350. Accordingly, the ductile stainless steel may have the austenite matrix structure and the average grain size of about 30 μm to 60 μm due to the heat input.

The heat input represents a heat amount entering into a metal member. Also, the heat input plays a very important role in metallographic microstructure control. Thus, in this embodiment, a thermal treatment method for controlling the heat input is proposed.

In the bright annealing process S7, the heat input may be determined according to a thermal treatment temperature, an atmospheric gas, or a feed rate of the pipe 310e.

In case of the bright annealing process S7 according to this embodiment, the thermal treatment temperature is about 1050° C. to 1100° C., the atmospheric gas is hydrogen or nitrogen, and the feed rate of the pipe 310e is 180 mm/min to 220 mm/min. Thus, the pipe 310e may pass through the annealing furnace 350 at a feed rate of about 180 mm/min to about 220 mm/min at an annealing heat treatment temperature of about 1050° C. to about 1100° C. in the annealing furnace 350.

Here, If the annealing heat treatment temperature is less than about 1,050° C., sufficient recrystallization of the ductile stainless steel does not occur, the fine grain structure is not obtained, and the flattened worked structure of the grain is generated to reduce creep strength. On the other hand, if the annealing temperature exceeds about 1,100° C., high-temperature intercrystalline cracking or ductility deterioration may occur.

Also, when the pipe 310e from which the welded beads are removed passes through the annealing furnace 350 at a transfer speed of less than 180 mm/min, the productivity is deteriorated due to a long time. On the other hand, when the pipe 310e passes through the annealing furnace 350 at a transfer speed exceeding about 220 mm/min, the stress existing in the ductile stainless steel is not sufficiently removed, and also the average grain size of the austenite matrix structure is less than about 30 μM. That is, if the transfer speed of the pipe 310e is too high, the average grain size of the ductile stainless steel is less than about 30 μm, and the low strength and low hardness properties required in the this embodiment may not be obtained.

As described above, the ductile stainless steel pipe according to the present invention, which is manufactured through the cold rolling process S1, the slitting process S2, the forming process S3, the welding process S4, the cutting process S5, the drawing process S6, and the bright annealing process S7 may be temporarily stored in a coiled state by a spool or the like and then be shipped. Although not shown, after the bright annealing process S7 is completed, shape correction and surface polishing processing may be further performed.

<Fatigue Fracture Test>

FIG. 15 is a graph illustrating result values obtained through an S-N curve test for comparing fatigue limits of the ductile stainless steel pipe according to the first embodiment of the present invention and a copper pipe according to the related art, and FIG. 16 is a graph illustrating an S-N curve teat of the ductile stainless steel pipe according to the first embodiment of the present invention.

Referring to FIGS. 15 and 16, the ductile stainless steel pipe according to the first embodiment of the present invention has a fatigue limit (or endurance limit) of about 200.52 MPa. This is a value greater by about 175 MPa (8 times) than the copper pipe according to the related art having a fatigue limit of 25 MPa. That is, the ductile stainless steel pipe may have improved durability, reliability, life expectancy, and freedom in design when compared to the copper pipe according to the related art. Hereinafter, effects of the ductile stainless steel pipe will be described in more detail.

[Maximum Allowable Stress]

The ductile stainless steel pipe may be determined in maximum allowable stress value on the basis of the fatigue limit value. For example, the maximum allowable stress of the ductile stainless steel pipe may be set to about 200 MPa when the air conditioner 10 is started or stopped and may be set to about 90 MPa when the air conditioner is in operation. The reason in which the maximum allowable stress has a small value during the operation of the air conditioner may be understood as reflecting the stress due to the refrigerant flowing in the piping in the operating state.

The maximum allowable stress represents a maximum stress limit that may be allowed to safely use a pipe or the like. For example, the pipe and the like may receive external force during use, and stress may be generated in the pipe due to the external force. Here, when the internal stress is equal to or greater than a certain critical stress value determined by a factor such as a solid material, the pipe may be permanently deformed or broken. Therefore, the maximum allowable stress may be set to safely use the pipe.

[Fatigue Limit]

When repeated stress is applied continuously to a solid material such as steel, the solid material may be broken at stress much lower than tensile strength. This is called fatigue of the material, and a failure due to the fatigue is called fatigue failure. The fatigue of the material occurs when the material undergoes a repeated load. Also, the material may be broken eventually when beyond a certain limit due to the repeated load. Here, an endurance limit in which the material is not broken even under repeated load is defined as a fatigue limit endurance limit.

[Relationship Between Fatigue Limit and S-N Curve]

An S-N curve shows the number of repetitions (N, cycles) until certain stress is repeated. In detail, the solid material is destroyed more quickly if it is subjected to repeated stress several times, and the number of repetitions of stress till the failure is affected by the amplitude of the applied stress. Thus, effects due to the degree of stress and the number of repetitions of stress until the solid material is broken may be analyzed through the S-N curve.

In the S-N curve test graph of FIGS. 15 and 16, a vertical axis represents a stress amplitude (Stress), and a horizontal axis represents a log value of the repetition number. Also, the S-N curve is a curve drawn along the log value of the number of repetitions until the material is destroyed when the stress amplitude is applied. In general, the S-N curve of the metal material increases as the stress amplitude decreases, the number of repetitions till the fracture increases. Also, when the stress amplitude is below a certain value, it is not destroyed even if it repeats infinitely. Here, the stress value at which the S-N curve becomes horizontal represents the fatigue limit or endurance limit of the above-mentioned material.

[Fatigue Limit Limitation of Copper Pipe]

In the S-N curve of the copper pipe according to the related art, which is based on fatigue failure test data of the copper pipe of FIG. 15 according to the related art, it is seen that the fatigue limit of the copper pipe according to the related art is about 25 MPa. That is, maximum allowable stress of the copper pipe is about 25 MPa. However, a case in which the stress of the pipe has a value of about 25 Mpa to about 30 MPa when the air conditioner is started or stopped may occur according to an operation state of the air conditioner (see FIG. 18). As a result, the copper pipe according to the related art has a limitation that the lifetime of the pipe is shortened, and the durability is deteriorated due to the stress value exceeding the degree of fatigue as described above.

[Effect of Ductile Stainless Steel Pipe]

Referring to FIGS. 15 and 16, in the SN curve according to this embodiment of the present invention, which is based on the fatigue failure test data of the ductile stainless steel pipe, the fatigue limit of the ductile stainless steel pipe is about 200.52 MPa, which is greater 8 times than that of the copper stainless steel pipe. That is, maximum allowable stress of the ductile stainless steel pipe is about 200 MPa. The stress in the pipe provided in the air conditioner does not exceed the maximum allowable stress of the flexible stainless steel pipe even when considering the maximum operation load of the air conditioner. Accordingly, when the ductile stainless steel pipe is used in an air conditioner, the lifespan of the pipe may be prolonged, and the durability and the reliability may be improved.

The ductile stainless steel pipe has a design margin of about 175 MPa when compared to the fatigue limit of the copper pipe. In detail, the outer diameter of the ductile stainless steel pipe is the same as the outer diameter of the copper pipe according to the related art, and the inner diameter may be expanded.

That is, a minimum thickness of the ductile stainless steel pipe may be less than that of the copper pipe, and even in this case, maximum allowable stress may be greater than that of the copper pipe due to the relatively high design margin. As a result, there is an effect that the degree of freedom in designing the ductile stainless steel pipe is improved.

<Stress Measurement Test>

Stress more than the fatigue limit of the copper pipe according to the related art may be generated in the pipe according to the operation conditions of the air conditioner. On the other hand, when the ductile stainless steel pipe is used in an air conditioner, the maximum stress value generated in the ductile stainless steel pipe does not reach the fatigue limit of the ductile stainless steel pipe. Hereinafter, this will be described in detail.

FIG. 17 is a view illustrating an attachment position of a stress measurement sensor for measuring stress of the pipe, and FIGS. 18 and 19 are test data tables illustrating result values measured by the stress measurement sensor of FIG. 17.

In detail, FIG. 18($a$) illustrates a stress measurement value of the copper pipe according to the related art and the ductile stainless steel pipe by classifying the start, the operation, and the stop state of the air conditioner when the air conditioner operates in a standard cooling mode, and FIG. 18($b$) illustrates a stress measurement value of the copper pipe according to the related art and the ductile stainless steel pipe by classifying the start, the operation, and the stop state of the air conditioner when the air conditioner operates in a standard heating mode.

Also, FIG. 19($a$) illustrates a stress measurement value as illustrated in FIG. 4($a$) when the air conditioner operates in an overload cooling mode, and FIG. 19($b$) illustrates a stress measurement value in the case where the air conditioner operates in an overload heating mode as illustrated in FIG. 4($b$).

[Installation Position of Stress Measurement Sensor]

Referring to FIG. 17, a plurality of stress measurement sensors may be installed in the suction pipe 210 for guiding the refrigerant to be suctioned into the compressor 100 and the discharge pipe 220 for guiding the refrigerant compressed at a high temperature and high pressure in the compressor to the condenser. In detail, the suction pipe 210 may be connected to the gas/liquid separator 150 to guide the refrigerant so that the refrigerant is suctioned into the gas/liquid separator 150. Also, the refrigerant passing through the suction pipe 210 and the discharge pipe 220 may include the R32, the R134a, or the R401a. In this embodiment, the R134a may be used as the refrigerant.

Since the refrigerant passing through the compressor 100 in view of the air conditioner cycle is a high-temperature high-pressure gas refrigerant, stress acting on the discharge pipe 220 is greater than that acting on other refrigerant pipes.

The compressor 100 may generate vibration during the compression of the low-pressure refrigerant into the high-pressure refrigerant. The stress of the pipes connected to the compressor 100 and the gas/liquid separator 150 may increase due to the vibration. Therefore, since the stress in the suction pipe 210 and the discharge pipe 220 are relatively higher than those of the other connection pipe, a stress measurement sensor may be installed in each of the suction pipe 210 and the discharge pipe 220 to confirm whether the stress is within the maximum allowable stress.

Also, the suction pipe 210 and the discharge pipe 220 may have the highest stress at a bent portion. The stress measuring sensor may be installed in two bent portions 215$a$ and 215$b$ of the suction pipe 210 and two bent portions 225$a$ and 225$b$ of the discharge pipe 220 to confirm whether stress acting on each of the suction pipe 210 and the discharge pipe 220 is within the maximum allowable stress.

[Stress Measurement of Copper Pipe According to Related Art]

Referring to FIGS. 18 and 19, when the suction pipe and the discharge pipe are provided as the copper pipe according to the related art, the maximum stress value is measured to about 4.9 MPa at the start time, about 9.6 MPa at the operating, and about 29.1 MPa at the stop time. As described above, the maximum stress measurement value of about 29.1 MPa at the stop time exceeds the maximum allowable stress value (about 25 MPa) of the copper pipe. Thus, the durability of the pipe may be shortened to shorten the lifespan of the pipe.

[Stress Measurement of Ductile Stainless Steel Pipe]

In case in which each of the suction pipe 210 and the discharge pipe 220 is provided as the ductile stainless steel pipe according to an embodiment of the present invention, the stress value is measured to about 19.2 MPa at the start, about 23.2 MPa at the operating, and about 38.7 MPa at the stop. That is, the measured stress value in the ductile stainless steel pipe satisfies the maximum allowable stress of about 200 MPa (start/stop) or about 90 MPa (operation) or less, and a difference from the maximum allowable stress is also very large.

Thus, the ductile stainless steel pipe has the improved durability as compared with the copper pipe according to the related art, and when the ductile stainless steel pipe is used as the suction pipe 210 and the discharge pipe 220, it provides the improved pipe lifespan and the improved reliability when compared to the existing copper pipe.

<Improvement of Performance (COP)>

FIG. 20 is a graph illustrating result values obtained through a test for comparing pressure losses within the pipes when each of the ductile stainless steel pipe according to the first embodiment of the present invention and the copper pipe according to the related art is used as a gas pipe, and FIG. 21 is a test result table illustrating performance of the ductile stainless steel pipe according to the first embodiment of the present invention and the copper pipe according to the related art. The gas pipe may be understood as a pipe for guiding a flow of an evaporated low-pressure gas refrigerant or a compressed high-pressure gas refrigerant on the basis of the refrigerant cycle. In more detail, FIGS. 20(a) and 21(a) are test graphs in the standard pipe (about 5 m), and FIGS. 20(b) and 21(b) are test graphs in the long pipe (about 50 m).

[Comparison of Pressure Loss in Pipe]

Referring to FIGS. 20(a) and 20(b), a vertical axis of the graph represents a pressure change amount or a pressure loss amount (ΔP=Pin-Pout, Unit KPa) in the gas pipe, and a horizontal axis represents the cooling mode or the heating mode of the air conditioner.

As described above, the ductile stainless steel pipe according to an embodiment of the present invention is significantly improved in durability and degree of design freedom when compared to the copper pipe according to the related art. Therefore, the ductile stainless steel pipe has the same outer diameter as the copper pipe and may have an inner diameter expanded more than the copper pipe. The ductile stainless steel pipe may decrease in flow resistance and increase in flow rate of the refrigerant when compared to the copper pipe due to the expanded inner diameter. Also, the ductile stainless steel pipe may be reduced in pressure loss in the pipe when compared to the copper pipe according to the related art.

[Comparison of Pressure Loss in Standard Pipe]

Referring to FIG. 20(a), the pressure loss with the pipe of the gas pipe is formed so that the pressure loss of the ductile stainless steel pipe is less by about 2.3 KPa than that of the copper pipe according to the related art with respect to the standard pipe having a length of about 5 m. In detail, in the cooling mode, a pressure loss (ΔP) of the ductile stainless steel pipe is about 6.55 KPa, and the pressure loss (ΔP) of the copper pipe is about 8.85 KPa. That is, in the cooling mode of the standard pipe (about 5 m), the pressure loss of the ductile stainless steel pipe is less by about 26% than that of the copper pipe.

Also, the pressure loss (ΔP) of the ductile stainless steel pipe is less by about 1.2 KPa than that (ΔP) of the copper pipe according to the related art in the heating mode of the standard pipe (about 5 m). That is, in the heating mode, a pressure loss (ΔP) of the ductile stainless steel pipe is about 3.09 KPa, and a pressure loss (ΔP) of the copper pipe is about 4.29 KPa. That is, in the heating mode of the standard pipe (about 5 m), the pressure loss of the ductile stainless steel pipe is less by about 28% than that of the copper pipe.

[Comparison of Pressure Loss in Long Pipe]

Referring to FIG. 20(b), the pressure loss with the pipe of the gas pipe is formed so that the pressure loss of the ductile stainless steel pipe is less by about 16.9 KPa than that of the copper pipe according to the related art with respect to the long pipe having a length of about 50 m. That is, in the cooling mode, a pressure loss (ΔP) of the ductile stainless steel pipe is about 50.7 KPa, and a pressure loss (ΔP) of the copper pipe is about 67.6 KPa. That is, in the cooling mode of the long pipe (about 50 m), the pressure loss of the ductile stainless steel pipe is less by about 26% than that of the copper pipe.

Also, the pressure loss (ΔP) of the ductile stainless steel pipe is less by about 10.2 KPa than that (ΔP) of the copper pipe according to the related art in the heating mode of the long pipe (about 50 m). That is, in the heating mode, a pressure loss (ΔP) of the ductile stainless steel pipe is about 29.03 KPa, and a pressure loss (ΔP) of the copper pipe is about 39.23 KPa. That is, in the heating mode of the long pipe (about 50 m), the pressure loss of the ductile stainless steel pipe is less by about 26% than that of the copper pipe.

[Performance Coefficient]

A refrigerant pressure loss may occur in the gas pipe and the suction pipe 210 or the discharge pipe 220 of the compressor 100. The refrigerant pressure loss causes an adverse effect such as decrease in refrigerant circulation amount, decrease in volume efficiency, increase in compressor discharge gas temperature, increase in power per unit refrigeration capacity, and decrease in coefficient of performance (COP).

Therefore, as illustrated in FIG. 20, when the gas pipe, the suction pipe, or the discharge pipe is provided as the ductile stainless steel pipe, the pressure loss in the pipe may be reduced when compared to the copper pipe according to the related art, a compressor work of the compressor (e.g., power consumption (kW)) may decrease, and the coefficient of performance (COP) may increase.

The coefficient of performance (COP) may be a measure of the efficiency of a mechanism for lowering or raising the temperature, such as the refrigerator, the air conditioner, the heat pump and may be defined as a ratio of the output or supplied heat quantity (refrigeration capacity or heating capacity) with respect to the quantity of the input work. Since the heat pump is a mechanism for rising a temperature, the heat pump may be called a heating performance coefficient and expressed as COPh, and the refrigerator or the air conditioner is a mechanism for lowering a temperature, the refrigerator or the air conditioner may be called a cooling performance coefficient and expressed as COPc. Also, the coefficient of performance (COP) is defined as a value obtained by dividing the heat quantity Q extracted from a heat source or supplied to the heat source by the work of the mechanical work.

[Comparison of Coefficient of Performance in Standard Pipe]

Referring to FIG. 21(a), the refrigeration capacity is about 9.36 kW for the copper pipe and about 9.45 kW for the ductile stainless steel pipe in the cooling mode of the standard pipe (5 m). That is, the heat quantity Q of the ductile stainless steel pipe is greater by about 100.9% than that of the copper pipe. Also, the power consumption is about 2.07 kW for the copper pipe and about 2.06 kW for the ductile stainless steel pipe. Therefore, since the COP is about 4.53 in the copper pipe and about 4.58 in the ductile stainless steel pipe, the ductile stainless steel pipe is improved to about 100.9% of the copper pipe according to the related art.

Also, in the heating mode of the standard pipe (about 5 m), the heating capacity is about 11.28 kW for the copper pipe and about 11.31 kW for the ductile stainless steel pipe. That is, the heat quantity Q of the ductile stainless steel pipe is greater by about 100.2% than that of the copper pipe. Also, the power consumption is about 2.55 kW for the copper pipe and about 2.55 kW for the ductile stainless steel pipe. Therefore, since the COP is about 4.43 in the copper pipe and about 4.44 in the ductile stainless steel pipe, the ductile stainless steel pipe is improved to about 100.2% of the copper pipe according to the related art.

[Comparison of Coefficient of Performance in Long Pipe]

The improvement of the efficiency (performance coefficient) due to the reduction of the pressure loss on the pipe is more evident in the lone pipe (about 50 m) than the standard pipe (about 5 m). That is, as the length of the pipe becomes longer, the performance of the ductile stainless steel pipe improved when compared to the copper pipe according to the related art may be further improved.

Referring to FIG. 21(b), in the cooling mode, the refrigeration capacity of the long pipe (about 5 m) may be about 8.03 kW in the ductile stain less pipe and be about 7.77 kW in the copper pipe. That is, the heat quantity Q of the ductile stainless steel pipe is greater by about 103.4% than that of the copper pipe. Also, the power consumption is about 2.08 kW for the copper pipe and about 2.08 kW for the ductile stainless steel pipe. Therefore, since the COP is about 3.74 in the copper pipe and about 3.86 in the ductile stainless steel pipe, the ductile stainless steel pipe is improved to about 103.2% of the copper pipe according to the related art.

Also, in the heating mode of the long pipe (about 50 m), the heating capacity is about 8.92 kW for the copper pipe and about 9.07 kW for the ductile stainless steel pipe. That is, the heat quantity Q of the ductile stainless steel pipe is greater by about 101.7% than that of the copper pipe. Also, the power consumption is about 2.54 kW for the copper pipe and about 2.53 kW for the ductile stainless steel pipe. Therefore, since the COP is about 3.51 in the copper pipe and about 3.58 in the ductile stainless steel pipe, the ductile stainless steel pipe is improved to about 102% of the copper pipe according to the related art.

<Corrosion Resistance Test>

FIG. 22 is a view illustrating a plurality of ductile stainless steel pipes, aluminum (Al) pipes, and copper pipes, which are objects to be tested for corrosion resistance, FIG. 23 is a table illustrating results obtained by measuring a corrosion depth for each pipe in FIG. 22, and FIG. 24 is a graph illustrating results of FIG. 23.

Corrosion resistance represents a property of a material to withstand corrosion and erosion. It is also called corrosion resistance. In general, stainless steel or titanium is more corrosion resistant than carbon steel because it is not well corroded. The corrosion resistance test includes a salt water spray test and a gas test. The resistance of the product to the atmosphere including the salt may be determined through the corrosion resistance test to examine the heat resistance, the quality and uniformity of the protective coating.

[Complex Corrosion Test]

Referring to FIGS. 22 to 24, when the cyclic corrosion test is performed on the ductile stainless steel pipe according to an embodiment of the present invention together with comparative groups (Al, Cu) of the other pipe, it is confirmed that the corrosion resistance is the most excellent because the corrosion depth (μm) is the smallest value in comparison with the comparative group. Hereinafter, this will be described in detail.

The cyclic corrosion test represents a corrosion test method in which an atmosphere of salt spraying, drying and wetting is repeatedly performed for the purpose of approaching or promoting the natural environment. For example, evaluation may be carried out by setting the test time to be 30 cycles, 60 cycles, 90 cycles, 180 cycles, and the like, with 8 times of one cycle, 2 hours of spraying with salt, 4 hours of drying, and 2 hours of wetting. The salt spraying test during the complex corrosion test is the most widely used as an accelerated test method for examining the corrosion resistance of plating and is a test for exposing a sample in the spray of saline to examine the corrosion resistance.

Referring to FIG. 22, a plurality of ductile stainless steel pipes S1, S2, and S3, a plurality of aluminum pipes A1, A2, and A3, and a plurality of copper pipes C1, C2, and C3 in which the complex corrosion test is performed, are illustrated, and the corrosion depth (μm) was measured by defining arbitrary positions D1 and D2 in each pipe.

[Test Result and Advantages of Ductile Stainless Steel Pipe]

Referring to FIGS. 23 and 24, the pip measured to have the deepest corrosion depth is the aluminum pipe having an average of about 95 μm. Next, the average copper pipe is about 22 μm, and the ductile stainless steel pipe has an average value of about 19 μm, which is the most corrosion-resistant measurement value. Also, the maximum value Max of the corrosion depth μm is the deepest of aluminum pipe to about 110 μm, followed by copper pipe to about 49 μm, and the soft stainless steel pipe to about 36 μm.

Attempts have been made to use the aluminum pipe to replace the copper pipe according to the related art. However, since the corrosion resistance is low as in the above-mentioned test results, there is a great disadvantage that the corrosion resistance is lowest. On the other hand, the ductile stainless steel pipe has the most excellent corrosion resistance and is superior in durability and performance to the pipe according to the related art.

<Bending Test>

In the case of installing an air conditioner by connecting pipes to each other according to individual installation environments, the pipe is not only a linear pipe, but also a bent pipe formed by bending external force of a worker installing the pipe. Also, the straight pipe or the bent pipe connects the outdoor unit to the indoor unit.

The stainless steel pipe according to the related art has strength greater than that of the copper pipe. Therefore, due to the high strength of the stainless steel pipe according to the related art, it is very difficult for an operator to apply external force to the pipe to form a bent pipe. Therefore, there has been a limitation that the copper pipe or the aluminum pipe has to be used for the convenience of installation work.

However, the strength of the ductile stainless steel pipe according to an embodiment of the present invention may be lower than that of the stainless steel pipe according to the related art and may be lowered to a level higher than that of the copper pipe according to the related art. Thus, since the above-mentioned bent pipe or the like may be formed, the low moldability of the stainless steel pipe according to the related art may be solved. Hereinafter, the bending test will be described below in detail.

[Shape of Bent Pipe and Curvature Radius]

FIG. 25 is view illustrating a shape in which the ductile stainless steel pipe is bent according to an embodiment of the present invention, FIG. 26 is a cross-sectional view illustrating a portion of the bent pipe, and FIG. 27 is a graph illustrating results obtained through a test for comparing bending loads according to deformation lengths of the ductile stainless steel pipe, the copper pipe, and the aluminum pipe.

Referring to FIG. 25, the ductile stainless steel pipe according to an embodiment of the present invention may be bent by bending force. For example, the ductile stainless steel pipe may have a '¬'-shape as illustrated in FIG. 25(a) or an 'S' shape as illustrated in FIG. 25(b).

Referring to FIGS. 25(a) and 25(b), a central line of the ductile stainless steel pipe may include a curved portion having a curvature so as to be bent in the other direction in one direction. Also, the curve has a curvature radius R.

The curvature radius R is defined as a value indicating a degree of curvature at each point of the curve. The curvature radius R of the ductile stainless steel pipe forming the curved line may include a minimum curvature radius Rmin that may be used in a pipe which does not generate wrinkles even when the straight pipe is formed into a curved line and does not generate vibration. Also, the minimum curvature radius Rmin may be measured in a bent pipe that meets a setting criterion for a ratio of maximum and minimum outside diameters.

[Ratio of Maximum/Minimum Outer Diameters of Ductile Stainless Steel Pipe]

Referring to FIG. 26, the ductile stainless steel pipe may be provided as a bent pipe so that a ratio (E/F) of a maximum outer diameter (F) to a minimum outer diameter (E) is more than 0.85 and less than 1.

The ratio of the maximum and minimum outside diameters (E/F) is a conservatively estimated standard based on the standards of ASME (American Society of Mechanical Engineers) and JIS (Japanese Industrial Standards) (see Table 5).

Table 5 below shows setting criteria for the ratio of the maximum and minimum diameters.

TABLE 5

| ASME | (F-E) < 0.08 * D |
|---|---|
| JIS | When R > 4D, E > (2/3) * D |
| Setting Criteria | (E/F) > 0.85 |

In Table 5, D represents a value of the straight pipe (a reference pipe), and R represents a curvature radius.

Comparison of Bendability of Ductile Stainless Steel Pipe, Copper Pipe, and Aluminum Pipe]

FIG. 27 illustrates results of testing the bending properties of the ductile stainless steel pipe satisfying the setting criteria (ratio of maximum and minimum outside diameters). In the bending property test, the ductile stainless steel pipe has a diameter Φ of about 15.88 mm.

The bending represents bending downward or upward in a state in which the beam is bent when a load is applied. When the beam is bent downward, tensile force acts on the bottom portion, and when the beam is bent upward, compressive force acts on the bottom portion.

Referring to FIG. 27, force N applied to the aluminum pipe, the copper pipe, and the ductile stainless steel pipe according to the deformation length (mm), each of which has a pipe diameter Φ of about 15.88 mm is illustrated.

When the minimum curvature radius Rmin is measured at the pipe having a diameter Φ of about 15.88 mm, the copper pipe has a diameter of about 85 mm, and the ductile stainless steel pipe has a diameter of about 70 mm. Accordingly, since the ductile stainless steel pipe has a curvature radius R less than that of the copper pipe, it may be bent to be equal to or higher than that of the copper pipe.

Thus, since the ductile stainless steel pipe forms the curved pipe at a level equivalent to that of the copper pipe, the moldability may be improved when compared to the stainless steel pipe according to the related art. Here, the bending force of the worker is assumed to the maximum bending load of the copper pipe and the aluminum pipe. In this embodiment, the bending force of the worker may be about 900 N.

In the graph of the bending property test result, the force N applied in the section of about 0 mm to about 2.5 mm of the deformation length may sharply increase, and then the force at the deformation length may gradually decrease in inclination to approach the maximum force N.

Also, in the graph of the bending property test result, the maximum bending load of the flexible stainless steel pipe may be about 750 N, and the maximum bending load of each of the copper pipe and the aluminum pipe may be about 900 N. That is, the maximum bending load of the ductile stainless steel pipe is less than that of the pipe according to the related art.

Therefore, the worker may form the ductile stainless steel pipe to be bent by using force within about 83% of the maximum bending load of each of the copper pipe and the aluminum pipe. As a result, the worker may form the ductile stainless steel pipe to be bent by applying force less than that applied to form the copper pipe and the aluminum pipe to be bent.

In summary, the ductile stainless steel pipe according to an embodiment of the present invention has an effect of improving the moldability when compared to the stainless steel pipe, the copper pipe and the aluminum pipe according to the related art. Therefore, the easy in the installation may be improved.

Second Embodiment

Hereinafter, descriptions will be made according to a second embodiment of the present invention. Since the current embodiment is different from the first embodiment in refrigerant pipe provided as a new material pipe, different parts between the first and second embodiments will be described principally, and descriptions of the same parts will be denoted by the same reference numerals and descriptions of the first embodiment.

FIG. 28 is a refrigeration cycle diagram of an air conditioner according to a second embodiment of the present invention.

[Refrigerant Pipe Constituted by New Material Pipe]

Referring to FIG. 28, an air conditioner 10 according to a second embodiment may have air-conditioning capacity of about 12 kW to about 17 kW. The air conditioner 10 may include a refrigerant pipe 50a guiding a flow of the refrigerant circulating through the refrigeration cycle. The refrigerant pipe 50a may include a new material pipe. Since the new material pipe has thermal conductivity less than that of the copper pipe, when the refrigerant flows through the refrigerant pipe 50a, a heat loss may be less than that a case in which the refrigerant flows through the copper pipe.

[First Refrigerant Pipe]

In detail, the refrigerant pipe 50a includes a first refrigerant pipe 51a extending from the second port 112 of the flow control valve 110 to the manifold 130, i.e., the outdoor heat exchanger 120. The first refrigerant pipe 51a may be provided as the new material pipe.

A high-pressure gas refrigerant flows through the first refrigerant pipe 51a during a cooling operation, and the low-pressure gas refrigerant flows during a heating operation. The first refrigerant pipe 51a may have an outer diameter of about 19.00 mm to about 19.10 mm on the basis of the air-conditioning capacity of the air conditioner 10.

For example, referring to Table 4, the refrigerant pipe 51a has an outer diameter of about 19.05 mm and a minimum thickness of about 0.29 mm on the basis of JIS B 8607. Thus, the first refrigerant pipe 51a may have an inner diameter of about 18.47 mm (=19.05−2*0.29) or less.

[Second Refrigerant Pipe]

The refrigerant pipe 50a further includes a second refrigerant pipe 52a extending from the distributor 140 to the main expansion device 155. The second refrigerant pipe 52a may be provided as the new material pipe.

A high-pressure liquid refrigerant flows through the second refrigerant pipe 52a during the cooling operation, and the low-pressure liquid refrigerant flows during the heating operation. The second refrigerant pipe 52a may have an outer diameter of about 12.60 mm to about 12.80 mm on the basis of the air-conditioning capacity of the air conditioner 10.

For example, referring to Table 4, the second refrigerant pipe 52a has an outer diameter of about 12.70 mm and a minimum thickness of about 0.20 mm on the basis of JIS B 8607. Thus, the second refrigerant pipe 52a may have an inner diameter of about 12.30 mm (=12.70−2*0.20) or less.

[Third Refrigerant Pipe]

The refrigerant pipe 50a further includes a third refrigerant pipe 53a extending from the main expansion device 155 to the first service valve 175. The third refrigerant pipe 53a may be provided as the new material pipe.

A high-pressure liquid refrigerant flows through the third refrigerant pipe 53a during the cooling and heating operations. The third refrigerant pipe 53a may have an outer diameter of about 9.45 mm to about 9.60 mm on the basis of the air-conditioning capacity of the air conditioner 10.

For example, referring to Table 4, the third refrigerant pipe 53a has an outer diameter of about 9.52 mm and a minimum thickness of about 0.16 mm on the basis of JIS B 8607. Thus, the second refrigerant pipe 52a may have an inner diameter of about 9.20 mm (=9.52−2*0.16) or less.

[Fourth Refrigerant Pipe]

The refrigerant pipe 50a further includes a fourth refrigerant pipe 54a extending from the second service valve 176 to the third port 113 of the flow control valve 110. The fourth refrigerant pipe 54a may be provided as the new material pipe.

A low-pressure gas refrigerant flows through the fourth refrigerant pipe 54a during the cooling operation, and a high-pressure gas refrigerant flows during the heating operation. The fourth refrigerant pipe 54a may have an outer diameter of about 15.80 mm to about 16.05 mm on the basis of the air-conditioning capacity of the air conditioner 10.

For example, referring to Table 4, the fourth refrigerant pipe 54a has an outer diameter of about 15.88 mm and a minimum thickness of about 0.25 mm on the basis of JIS B 8607. Thus, the fourth refrigerant pipe 54a may have an inner diameter of about 15.38 mm (=15.88−2*0.25) or less.

INDUSTRIAL APPLICABILITY

According to this embodiment, the austenite type stainless steel pipe may be applied to secure ductility at the level of the copper tube when compared to the stainless steel pipe according to the related art, and thus, the bent stainless steel pipe may be applied to the refrigerant circulation cycle. Therefore, industrial applicability is significantly high.

The invention claimed is:

1. An air conditioner comprising:
an outdoor unit comprising a compressor, an outdoor heat exchanger, and an expansion valve, wherein a refrigerant is circulated by a refrigerant pipe configured to connect the compressor, the outdoor heat exchanger, and the expansion valve to each other;
an indoor unit comprising an indoor heat exchanger; and
a connection pipe configured to connect the outdoor unit to the indoor unit,
wherein the air conditioner has refrigeration capacity of 16 kW to 28 kW,
a single refrigerant R134a is used as the refrigerant,
the refrigerant pipe is made of a ductile stainless steel material having an austenite matrix structure of 99% or more and a delta ferrite matrix structure of 1% or less on the basis of a grain area,
an average grain diameter of the austenite matrix structure is 30 μm to 60 μm,
the refrigerant pipe comprises a suction pipe that guides suction of the refrigerant into the compressor and has an outer diameter of 22.20 mm,
the ductile stainless steel material comprising:
percent by weight, C: exceeding 0 to 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: exceeding 0 to 0.03% or less, P: exceeding 0 to 0.04% or less, S: exceeding 0 to 0.04% or less and N: exceeding 0 to 0.03% or less.

2. The air conditioner according to claim 1, wherein the refrigerant pipe further comprises a discharge pipe that guides discharge of the refrigerant compressed in the compressor and has an outer diameter of 15.88 mm.

3. The air conditioner according to claim 2, wherein the suction pipe has an inner diameter of about 21.54 mm or less, and the discharge pipe has an inner diameter of 15.38 mm or less.

4. The air conditioner according to claim 1, wherein the refrigerant pipe further comprises a discharge pipe that guides discharge of the refrigerant compressed in the compressor and has an outer diameter of 12.70 mm.

5. The air conditioner according to claim 4, wherein the suction pipe has an inner diameter of 21.54 mm or less, and the discharge pipe has an inner diameter of 12.30 mm or less.

6. The air conditioner according to claim 1, wherein the refrigerant pipe further comprises a discharge pipe that guides discharge of the refrigerant compressed in the compressor and has an outer diameter of 19.05 mm.

7. The air conditioner according to claim 6, wherein the suction pipe has an inner diameter of 21.54 mm or less, and the discharge pipe has an inner diameter of 18.47 mm or less.

8. An air conditioner comprising:
a compressor;
an outdoor heat exchanger;
an expansion valve;
an outdoor unit comprising a refrigerant pipe connecting the outdoor heat exchanger to the expansion valve;
an indoor unit comprising an indoor heat exchanger; and
a connection pipe connecting the outdoor unit to the indoor unit,
wherein the air conditioner has refrigeration capacity of about 16 kW to about 28 kW,
a mixed refrigerant R134a is used as the refrigerant,
the refrigerant pipe is made of a ductile stainless steel material having an austenite matrix structure of 99% or more and a delta ferrite matrix structure of about 1% or less on the basis of a grain area,
an average grain diameter of the austenite matrix structure is 30 μm to 60 μm,
the refrigerant pipe comprises a suction pipe that guides suction of the refrigerant into the compressor and has an outer diameter of 19.05 mm,
the ductile stainless steel material comprising:
percent by weight, C: exceeding 0 to 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: exceeding 0 to 0.03% or less, P: exceeding 0 to 0.04% or less, S: exceeding 0 to 0.04% or less and N: exceeding 0 to 0.03% or less.

9. The air conditioner according to claim 8, wherein the refrigerant pipe further comprises a discharge pipe that guides discharge of the refrigerant compressed in the compressor and has an outer diameter of 15.88 mm.

10. The air conditioner according to claim 9, wherein the suction pipe has an inner diameter of 18.47 mm or less, and the discharge pipe has an inner diameter of 15.38 mm or less.

11. The air conditioner according to claim 8, wherein the refrigerant pipe further comprises a discharge pipe that guides discharge of the refrigerant compressed in the compressor and has an outer diameter of 12.70 mm.

12. The air conditioner according to claim 11, wherein the suction pipe has an inner diameter of 18.47 mm or less, and the discharge pipe has an inner diameter of 12.30 mm or less.

13. The air conditioner according to claim 8, wherein the refrigerant pipe further comprises a discharge pipe that guides discharge of the refrigerant compressed in the compressor and has an outer diameter of 19.05 mm.

14. The air conditioner according to claim 13, wherein the suction pipe has an inner diameter of 18.47 mm or less, and the discharge pipe has an inner diameter of 18.47 mm or less.

15. An air conditioner comprising:
a compressor;
an outdoor heat exchanger;
an expansion valve;
an outdoor unit comprising a refrigerant pipe connecting the outdoor heat exchanger to the expansion valve;
an indoor unit comprising an indoor heat exchanger; and
a connection pipe connecting the outdoor unit to the indoor unit,
wherein the air conditioner has refrigeration capacity of about 16 kW to about 28 kW,
a mixed refrigerant R134a is used as the refrigerant, the refrigerant pipe is made of a ductile stainless steel material having an austenite matrix structure of 99% or more and a delta ferrite matrix structure of about 1% or less on the basis of a grain area,
an average grain diameter of the austenite matrix structure is 30 μm to 60 μm,
the refrigerant pipe comprises a suction pipe that guides suction of the refrigerant into the compressor and has an outer diameter of 25.40 mm,
the ductile stainless steel material comprising:
percent by weight, C: exceeding 0 to 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: exceeding 0 to 0.03% or less, P: exceeding 0 to 0.04% or less, S: exceeding 0 to 0.04% or less and N: exceeding 0 to 0.03% or less.

16. The air conditioner according to claim 15, wherein the refrigerant pipe further comprises a discharge pipe that guides discharge of the refrigerant compressed in the compressor and has an outer diameter of 15.88 mm.

17. The air conditioner according to claim 16, wherein the suction pipe has an inner diameter of 24.68 mm or less, and the discharge pipe has an inner diameter of 15.38 mm or less.

18. The air conditioner according to claim 15, wherein the refrigerant pipe further comprises a discharge pipe that guides discharge of the refrigerant compressed in the compressor and has an outer diameter of 12.70 mm.

19. The air conditioner according to claim 18, wherein the suction pipe has an inner diameter of 24.68 mm or less, and the discharge pipe has an inner diameter of 12.30 mm or less.

20. The air conditioner according to claim 15, wherein the refrigerant pipe further comprises a discharge pipe that guides discharge of the refrigerant compressed in the compressor and has an outer diameter of 19.05 mm.

21. The air conditioner according to claim 20, wherein the suction pipe has an inner diameter of 24.68 mm or less, and the discharge pipe has an inner diameter of 18.47 mm or less.

* * * * *